United States Patent
Karande et al.

(10) Patent No.: US 11,470,131 B2
(45) Date of Patent: Oct. 11, 2022

(54) USER DEVICE PROCESSING OF INFORMATION FROM A NETWORK-ACCESSIBLE COLLABORATION SYSTEM

(71) Applicant: Box, Inc., Redwood City, CA (US)

(72) Inventors: Advait Karande, Foster City, CA (US);
Tanooj Luthra, San Diego, CA (US);
Ritik Malhotra, San Jose, CA (US)

(73) Assignee: Box, Inc., Redwood City, CA (US)

( * ) Notice: Subject to any disclaimer, the term of this patent is extended or adjusted under 35 U.S.C. 154(b) by 75 days.

(21) Appl. No.: 16/029,544

(22) Filed: Jul. 7, 2018

(65) Prior Publication Data

US 2019/0014160 A1  Jan. 10, 2019

Related U.S. Application Data

(60) Provisional application No. 62/530,002, filed on Jul. 7, 2017.

(51) Int. Cl.
*H04L 65/401* (2022.01)
*H04L 67/1097* (2022.01)
(Continued)

(52) U.S. Cl.
CPC .......... *H04L 65/4015* (2013.01); *G06F 16/14* (2019.01); *G06F 16/168* (2019.01);
(Continued)

(58) Field of Classification Search
CPC . H04L 65/4015; H04L 67/06; H04L 67/1097;
G06F 16/168; G06F 16/14;
(Continued)

(56) References Cited

U.S. PATENT DOCUMENTS 6,512,529 B1  1/2003 Janssen
6,539,382 B1 * 3/2003 Byrne ................. G06F 12/0862
711/118
(Continued)

OTHER PUBLICATIONS

Davies, CEO & Founder, "Distributed Filesystem Comparison", URL: https://juicefs.com/blog/en/posts/distributed-filesystem-comparison/, Jun. 23, 2018.
(Continued)

*Primary Examiner* — John A Follansbee
*Assistant Examiner* — Fadi Haj Said
(74) *Attorney, Agent, or Firm* — Vista IP Law Group, LLP

(57) ABSTRACT

Executable code comprising a local file system is stored at a collaboration system server for downloading. The remote collaboration system responds to a message from a user device to download the local file system. The local file system to be downloaded is configured to operate on the user device so as to issue requests from the user device to perform an initial access to server-side collaboration data. The collaboration system responds to such requests by predicting interests of the user, which predictions are used to retrieve additional server-side collaboration data. The additional server-side collaboration data is sent to the user device and stored on the user device in an area for locally-stored collaboration system information. The user provides search terms for searching the locally-stored collaboration system information, and results are displayed on the user device. The results are displayed without the need to perform additional communications with remote collaboration system.

21 Claims, 15 Drawing Sheets

(51) Int. Cl.
*H04L 67/06* (2022.01)
*G06F 16/248* (2019.01)
*G06F 16/9535* (2019.01)
*G06F 16/14* (2019.01)
*G06F 16/16* (2019.01)

(52) U.S. Cl.
CPC ........ *G06F 16/248* (2019.01); *G06F 16/9535* (2019.01); *H04L 67/06* (2013.01); *H04L 67/1097* (2013.01)

(58) Field of Classification Search
CPC .............. G06F 16/9535; G06F 16/248; G06F 17/30867; G06F 17/30554
See application file for complete search history.

(56) References Cited

U.S. PATENT DOCUMENTS

| | | | |
|---|---|---|---|
| 6,750,858 B1 | 6/2004 | Rosenstein | |
| 7,047,309 B2 | 5/2006 | Baumann | |
| 7,620,633 B1* | 11/2009 | Parsons | G06F 16/907 715/788 |
| 7,694,065 B2 | 4/2010 | Petev | |
| 7,975,018 B2 | 7/2011 | Unrau | |
| 8,180,801 B2 | 5/2012 | Zhang | |
| 8,423,606 B1 | 4/2013 | Streeter | |
| 8,489,549 B2 | 7/2013 | Guarraci | |
| 8,527,549 B2 | 9/2013 | Cidon | |
| 8,634,456 B2 | 1/2014 | Chen | |
| 8,826,332 B2 | 9/2014 | Marshall | |
| 8,849,761 B2 | 9/2014 | Prahlad | |
| 8,886,894 B2 | 11/2014 | Adi-Tabatabai | |
| 8,948,258 B2 | 2/2015 | Chen | |
| 8,954,596 B2 | 2/2015 | Ronca | |
| 9,015,470 B2 | 4/2015 | Losev | |
| 9,191,725 B2 | 11/2015 | Schmidt | |
| 9,210,085 B2 | 12/2015 | Harrison | |
| 9,253,166 B2 | 2/2016 | Gauda | |
| 9,288,510 B1 | 3/2016 | Yang | |
| 9,294,530 B2 | 3/2016 | McCormick | |
| 9,307,258 B2 | 4/2016 | Macinnis | |
| 9,313,510 B2 | 4/2016 | Shivadas | |
| 9,319,678 B2 | 4/2016 | Coudurier | |
| 9,332,050 B2 | 5/2016 | Collard | |
| 9,384,209 B2 | 7/2016 | Kim | |
| 9,392,304 B2 | 7/2016 | Coudurier | |
| 9,432,704 B2 | 8/2016 | Mutton | |
| 9,444,695 B2 | 9/2016 | Dutta | |
| 9,501,212 B2 | 11/2016 | Marshall | |
| 9,544,348 B2 | 1/2017 | Devereaux | |
| 9,621,613 B1 | 4/2017 | Huang | |
| 9,628,268 B2 | 4/2017 | Kiang et al. | |
| 9,715,428 B1 | 7/2017 | Morshed | |
| 9,756,022 B2 | 9/2017 | Amiri et al. | |
| 9,788,015 B2 | 10/2017 | Chen | |
| 9,811,532 B2 | 11/2017 | Parkison et al. | |
| 9,852,361 B1 | 12/2017 | Prasad | |
| 9,900,608 B2 | 2/2018 | Coudurier | |
| 9,930,365 B2 | 3/2018 | Chen | |
| 9,940,241 B1 | 4/2018 | Mehrotra | |
| 9,973,564 B2 | 5/2018 | Dong | |
| 10,033,787 B2 | 7/2018 | Ronca | |
| 10,063,872 B2 | 8/2018 | Coward | |
| 10,409,781 B2 | 9/2019 | Malhotra et al. | |
| 2002/0078174 A1* | 6/2002 | Sim | G06F 16/182 709/219 |
| 2004/0100937 A1 | 5/2004 | Chen | |
| 2004/0107319 A1 | 6/2004 | D'Orto | |
| 2005/0080810 A1* | 4/2005 | Matsuura | G06F 3/0605 707/999.102 |
| 2006/0004765 A1* | 1/2006 | Anderson | G06F 16/10 |
| 2006/0059509 A1 | 3/2006 | Huang | |
| 2007/0076626 A1 | 4/2007 | Wise | |
| 2008/0098237 A1 | 4/2008 | Dung | |
| 2009/0016445 A1 | 1/2009 | Gao | |
| 2009/0310669 A1 | 12/2009 | Konoshima | |
| 2010/0070608 A1 | 3/2010 | Hosur | |
| 2010/0211690 A1 | 8/2010 | Pakzad | |
| 2010/0268840 A1 | 10/2010 | Hiie | |
| 2010/0332479 A1 | 12/2010 | Prahlad | |
| 2011/0066668 A1 | 3/2011 | Guarraci | |
| 2011/0096828 A1 | 4/2011 | Chen | |
| 2011/0194613 A1 | 8/2011 | Chen | |
| 2011/0218983 A1* | 9/2011 | Chaney | G06F 16/686 707/705 |
| 2011/0231519 A1 | 9/2011 | Luby | |
| 2011/0231569 A1 | 9/2011 | Luby | |
| 2011/0238789 A1 | 9/2011 | Luby | |
| 2011/0239078 A1 | 9/2011 | Luby | |
| 2011/0246616 A1 | 10/2011 | Ronca | |
| 2011/0305273 A1 | 12/2011 | He | |
| 2011/0320733 A1 | 12/2011 | Sanford | |
| 2012/0023249 A1 | 1/2012 | Chen | |
| 2012/0158802 A1 | 6/2012 | Lakshmanan | |
| 2012/0278497 A1 | 11/2012 | Hsu | |
| 2012/0331089 A1 | 12/2012 | Vonog | |
| 2013/0013803 A1 | 1/2013 | Bichot | |
| 2013/0110961 A1 | 5/2013 | Jadhav | |
| 2013/0117418 A1 | 5/2013 | Mutton | |
| 2013/0138810 A1 | 5/2013 | Binyamin | |
| 2013/0223509 A1 | 8/2013 | Tweedale | |
| 2013/0238785 A1 | 9/2013 | Hawk | |
| 2013/0276048 A1 | 10/2013 | Krasic | |
| 2013/0339470 A1 | 12/2013 | Jeswani | |
| 2014/0006354 A1 | 1/2014 | Parkison et al. | |
| 2014/0118379 A1 | 5/2014 | Hakura | |
| 2014/0119457 A1 | 5/2014 | Macinnis | |
| 2014/0140417 A1 | 5/2014 | Shaffer | |
| 2014/0153909 A1 | 6/2014 | Macinnis | |
| 2014/0177733 A1 | 6/2014 | Coudurier | |
| 2014/0181864 A1 | 6/2014 | Marshall | |
| 2014/0201141 A1 | 7/2014 | Vibhor et al. | |
| 2014/0214889 A1* | 7/2014 | Zuckerman | G06F 16/148 707/769 |
| 2014/0269932 A1 | 9/2014 | Su | |
| 2014/0281009 A1 | 9/2014 | Moorthy | |
| 2014/0282771 A1 | 9/2014 | Tumuluru | |
| 2014/0324777 A1* | 10/2014 | Novak | G06F 16/1744 707/624 |
| 2014/0324929 A1 | 10/2014 | Mason, Jr. | |
| 2014/0337290 A1* | 11/2014 | Uraltsev | G06F 16/178 707/634 |
| 2014/0351455 A1 | 11/2014 | McCormick | |
| 2014/0380376 A1 | 12/2014 | Schmidt | |
| 2015/0039726 A1 | 2/2015 | Hoffert | |
| 2015/0067753 A1 | 3/2015 | Shemesh | |
| 2015/0073798 A1* | 3/2015 | Karov | G06F 16/36 704/243 |
| 2015/0098690 A1 | 4/2015 | Abbate | |
| 2015/0227602 A1 | 8/2015 | Ramu | |
| 2015/0372939 A1 | 12/2015 | Redler, IV | |
| 2016/0014095 A1 | 1/2016 | Strayer | |
| 2016/0065364 A1 | 3/2016 | Amiri et al. | |
| 2016/0103851 A1 | 4/2016 | Dimitrov | |
| 2016/0119657 A1 | 4/2016 | Sun | |
| 2016/0323351 A1 | 4/2016 | Lurhra et al. | |
| 2016/0147432 A1* | 5/2016 | Shi | G06F 3/0481 715/753 |
| 2016/0156948 A1 | 6/2016 | Yang | |
| 2016/0173900 A1 | 6/2016 | Lee | |
| 2016/0212440 A1 | 7/2016 | Coudurier | |
| 2016/0234282 A1 | 8/2016 | Lederer | |
| 2016/0321287 A1* | 11/2016 | Luthra | H04L 67/06 |
| 2016/0321288 A1 | 11/2016 | Malhotra et al. | |
| 2016/0321291 A1 | 11/2016 | Malhotra et al. | |
| 2016/0321311 A1 | 11/2016 | Tallamraju et al. | |
| 2016/0323358 A1 | 11/2016 | Malhotra et al. | |
| 2017/0124073 A1* | 5/2017 | McKenzie | H04L 67/06 |
| 2017/0134344 A1 | 5/2017 | Wu | |
| 2017/0141921 A1 | 5/2017 | Berger | |
| 2017/0300581 A1* | 10/2017 | Westbrook | G06F 16/9535 |

(56) References Cited

U.S. PATENT DOCUMENTS

2018/0098083 A1    4/2018  McAllister
2018/0188901 A1*   7/2018  Shtuchkin .............. G06Q 10/10
2018/0210713 A1*   7/2018  Busjaeger ........... G06F 16/2471

OTHER PUBLICATIONS

Sakshi Bansal, "GlusterFS: A dependable distributed file system", URL: https://opensourceforu.com/2017/01/glusterfs-a-dependable-distributed-file-system/, Jan. 12, 2017.
Paul Krzyzanowski, "Distributed File Systems Design", URL: https://www.cs.rutgers.edu/~pxk/417/notes/15-nas.html, Sep. 14, 2012.
Blomer, Jakob. "A survey on distributed file system technology." *Journal of Physics: Conference Series*. vol. 608. No. 1. IOP Publishing, 2015.
Petros Koutopis, "The Lustre Distributed Filesystem", URL: https://www.linuxjournal.com/content/lustre-distributed-filesystem, Nov. 28, 2011.
Jake Edge, "The OrangeFS distributed filesystem", URL: https://lwn.net/Articles/643185/, May 6, 2015.
Nievergelt, Jürg, Hans Hinterberger, and Kenneth C. Sevcik. "The grid file: An adaptable, symmetric multikey file structure." ACM Transactions on Database Systems (TODS) 9.1 (1984): 38-71.
Ted Hudek et al., "Introduction to Remote File Systems", URL: https://docs.microsoft.com/en-us/windows-hardware/drivers/ifs/introduction-to-remote-file-systems, Apr. 20, 2017.
Muqun Yang et al., "Accessing HDF5 Files via SSHFS (FUSE)", The HDF Group, Nov. 19, 2010.
Vijay Vasudevan, "Distributed Filesystems", URL: https://www.es.cmu.edu/~dga/15-440/F10/lectures/08-distfs1.pdf, Sep. 2009.
Zhang, Yupu, et al. "ViewBox: Integrating local file systems with cloud storage services." 12th {USENIX} Conference on File and Storage Technologies ({FAST} 14). 2014.
Kathuria, Vishal, and Bruce Jackson. "Design and Implementation of WFS-A Web File System For Linux 2.2."
Lukas White, "Abstract File Systems with Flysystem", URL: https://www.sitepoint.com/abstract-file-systems-flysystem/, Apr. 6, 2014.
Sandberg, Russel, et al. "Design and implementation of the Sun network filesystem." Proceedings of the Summer USENIX conference. 1985.
Paul White, "How To Use SSHFS to Mount Remote File Systems Over SSH", URL: https://www.digitalocean.com/community/tutorials/how-to-use-sshfs-to-mount-remote-file-systems-over-ssh, Nov. 9, 2016.

* cited by examiner

Display at T0

| 🏠 | 🔍 Fi | | |
|---|---|---|---|
| ⭐ | 📄 File1.docx | 📄 | • Author<br>• Modification Data |
| 🕐 | 🖼 File2.jpg | | • Filetype |

Display at T1 — Merged-In Previews — Merged-In Updates from Server

| 🏠 | 🔍 Fi | | |
|---|---|---|---|
| ⭐ | 📄 File1.docx | 📄 | • Author<br>• Modification Data |
| 🕐 | 📄 File1-Addendum.docx | 📄 | • Author<br>• Modification Data |
| | 🖼 File2.jpg | | • Filetype |

FIG. 7B

USER DEVICE PROCESSING OF INFORMATION FROM A NETWORK-ACCESSIBLE COLLABORATION SYSTEM

RELATED APPLICATIONS

The present application claims the benefit of priority to U.S. Patent Application Ser. No. 62/530,002 titled "USER DEVICE PROCESSING OF EVENTS FROM A COLLABORATION SYSTEM", filed Jul. 7, 2017, which is hereby incorporated by reference in its entirety.

FIELD

This disclosure relates to collaboration systems, and more particularly to techniques for user device processing of events from a collaboration system.

BACKGROUND

Traditional client-server models that operate between a user device (client) and a storage repository (server) allow a user to interact through a user interface to see files, folders and other objects that are stored in the storage repository. For example, when a user operating a user device wants to interact with a storage repository at a network-accessible server (e.g., to view files, navigate through a hierarchy of folders, etc.) the client device and server carry out an exchange of messages pertaining to items of interest (e.g., items of interest that are stored at the server). The items of interest are then delivered over the network to the client device. For example, the server might respond to a request for a directory or folder view with a listing of all files or subfolders in the particular directory or folder. The user can then peruse through the listing to identify files and/or subfolders of interest. As the user continues to interact with the listing, additional listings might be requested from the server, and so on. Each time the user requests additional information from the server, the client device and the server initiate a new protocol exchange.

Unfortunately, the time needed for carrying out the protocol between the client device and the server introduces unwanted latency, which latency is sometimes so long (e.g., during periods of high network traffic) that the user experiences frustration with the slow or 'sluggish' responses from the server. This situation is often exacerbated inasmuch as user interfaces and client-server communication models have not kept pace with the ways that files, folders, and other objects are used in collaboration environments. What is needed is a technique or techniques for presenting information pertaining to folders, files and/or other objects of a collaboration system without introducing unwanted latency or "sluggishness".

SUMMARY

The present disclosure describes techniques used in systems, methods, and in computer program products for user device processing of events from a collaboration system, which techniques advance the relevant technologies to address technological issues with legacy approaches. More specifically, the present disclosure describes techniques used in systems, methods, and in computer program products for user device processing of events from a collaboration system. Certain embodiments are directed to technological solutions for new ways to collect, process and present events and other information pertaining to such collaboration.

The disclosed embodiments modify and improve over legacy approaches. In particular, the herein-disclosed techniques provide technical solutions that address the technical problems attendant to usage of collaboration systems that introduce new ways for users to interact over files, folders and other objects. Known legacy techniques for presenting information pertaining file and folder are inadequate and new technical solutions are needed for presenting information pertaining to collaboration activities. Such technical solutions relate to improvements in computer functionality. Various applications of the herein-disclosed improvements in computer functionality serve to reduce the demand for computer memory, reduce the demand for computer processing power, reduce network bandwidth use, and reduce the demand for inter-component communication. Some embodiments disclosed herein use techniques to improve the functioning of multiple systems within the disclosed environments, and some embodiments advance peripheral technical fields as well. As one specific example, use of the disclosed techniques and devices within the shown environments as depicted in the figures provide advances in the technical field of human-machine interfaces as well as advances in various technical fields related to scalable collaboration systems.

Further details of aspects, objectives, and advantages of the technological embodiments are described herein and in the drawings and claims.

BRIEF DESCRIPTION OF THE DRAWINGS

The drawings described below are for illustration purposes only. The drawings are not intended to limit the scope of the present disclosure.

FIG. 7A and FIG. 7B depict merging techniques as used in systems that perform client-side processing of events received from a collaboration system, according to an embodiment.

DETAILED DESCRIPTION

Figure 1A:
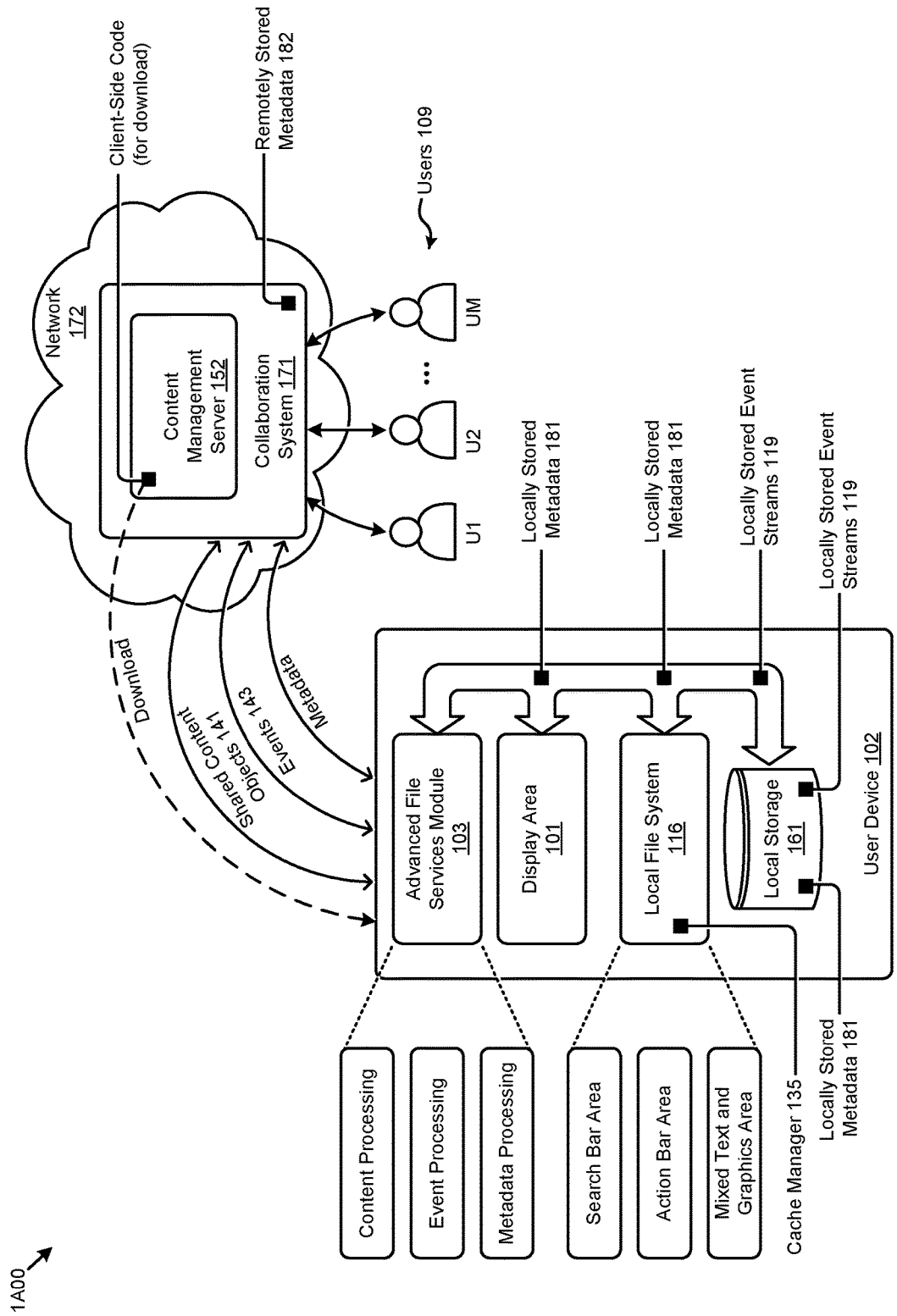
FIG. 1A presents an environment in which collaboration events and content object metadata can be processed in accordance with the disclosed embodiments.

Embodiments in accordance with the present disclosure address problems pertaining to user interaction with collaboration systems. Many activities pertaining to collaboration demand introduction of new ways for users relate to other users and/or shared files, folders and other objects. Some embodiments are directed to approaches for new ways to collect events pertaining to the aforementioned activities. Some embodiments process and present events and other information pertaining to such collaboration in ways that allow a user to relate more cognitively to other users and their collaboration activities. The accompanying figures and discussions herein present example environments, systems, methods, and computer program products for user device processing of events from a collaboration system.

Overview

One way to address the deficiencies of legacy client-server user interfaces is to increase the amount and type of processing that is performed on the user device or devices that interface with a collaboration system. To ameliorate these deficiencies, new specialized displays and new specialized client-side processing are defined so as to process combinations of local data (e.g., at the user device) together with cloud-based collaboration system data, and then to process and present the information (e.g., at the client-side user device) in new ways that aid collaboration endeavors.

Definitions and Use of Figures

Some of the terms used in this description are defined below for easy reference. The presented terms and their respective definitions are not rigidly restricted to these definitions—a term may be further defined by the term's use within this disclosure. The term "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion. As used in this application and the appended claims, the term "or" is intended to mean an inclusive "or" rather than an exclusive "or". That is, unless specified otherwise, or is clear from the context, "X employs A or B" is intended to mean any of the natural inclusive permutations. That is, if X employs A, X employs B, or X employs both A and B, then "X employs A or B" is satisfied under any of the foregoing instances. As used herein, at least one of A or B means at least one of A, or at least one of B, or at least one of both A and B. In other words, this phrase is disjunctive. The articles "a" and "an" as used in this application and the appended claims should generally be construed to mean "one or more" unless specified otherwise or is clear from the context to be directed to a singular form.

Various embodiments are described herein with reference to the figures. It should be noted that the figures are not necessarily drawn to scale and that elements of similar structures or functions are sometimes represented by like reference characters throughout the figures. It should also be noted that the figures are only intended to facilitate the description of the disclosed embodiments—they are not representative of an exhaustive treatment of all possible embodiments, and they are not intended to impute any limitation as to the scope of the claims. In addition, an illustrated embodiment need not portray all aspects or advantages of usage in any particular environment.

An aspect or an advantage described in conjunction with a particular embodiment is not necessarily limited to that embodiment and can be practiced in any other embodiments even if not so illustrated. References throughout this specification to "some embodiments" or "other embodiments" refer to a particular feature, structure, material or characteristic described in connection with the embodiments as being included in at least one embodiment. Thus, the appearance of the phrases "in some embodiments" or "in other embodiments" in various places throughout this specification are not necessarily referring to the same embodiment or embodiments. The disclosed embodiments are not intended to be limiting of the claims.

Descriptions of Example Embodiments

FIG. 1A presents an environment 1A00 in which collaboration events and content object metadata can be processed in accordance with the disclosed embodiments. As an option, one or more variations of environment 1A00 or any aspect thereof may be implemented in the context of the architecture and functionality of the embodiments described herein.

In this environment, a user is able to take advantage of all of the data and features of a large, multi-user deployment of a collaboration system 171 while enjoying the mobility afforded by a user device that is connected to the collaboration system over network 172. Specifically, in this environment, the user can download client-side code from the collaboration system. After downloading the client-side code, the user device 102 hosts an implementation of a local file system 116 that includes a local index engine 127 that can process files, folders, metadata and events and save results of such processing into locally-stored metadata 181. In some cases, the extent of the locally-stored metadata 181 is sufficient that the user device can process many or all file-oriented operations locally—without having to continually communicate over the network to the collaboration system.

The local file system is executable code, executable on the user device, which executable code is configured to carry out a protocol with the collaboration system to request server-side collaboration data from the collaboration server. The collaboration server responds to such requests by making predictions of what server-side collaboration data is related to the request, and sending the predicted server-side collaboration data to the user device. Thus, when a user performs a file system operation using the local file system (e.g., a search for a file in a folder), the operation can be performed locally using the predicted server-side collaboration data that is already on the user device. As such, the local file system can process user input to search the locally-stored collaboration system information without performing additional accesses to the remotely-stored collaboration system information. This eliminates or reduces the user device reliance on availability and/or performance of the network between the user device and the remotely-stored collaboration system information.

In this particular deployment, the shown collaboration system 171 is a cloud-based content management system. Such a cloud-based content management system supports any number of users 109 that access the content management server or servers through Internet connections from their user device into the cloud. A user device can perform local computer processing as well as communications to/from the cloud-based content management system. Such communications can include content (e.g., shared collaboration objects) as well as events and/or metadata (e.g., shared collaboration object metadata) pertaining to such content. More specifically, a user can implement advanced file services (e.g., via an advanced file services module 103), and results from processing of advanced file services can be displayed (e.g., in a display area 101) of the user device 102. In sample embodiments, the display area includes a search bar area, an action bar area, and screen display area to present combinations of text and graphics.

Interactions between the user device 102, and a collaboration system server (e.g., content management server 152) of the collaboration system 171 are facilitated by the shown advanced file services module 103. The advanced file services module 103 is cooperatively coupled with a local file system 116 that provides local management of files, folders, metadata and events. As needed, the local file system accesses local storage 161 for information that is then displayed to the user. As shown, the local storage comprises locally-stored metadata 181 and locally stored event streams 119. As such, when events and/or contents of interest are accessible in the locally-stored metadata 181 and/or are accessible within the locally stored event streams 119, the advanced file services module and/or other components within the user device can access that metadata from within the user device without having to rely on network 172. Thus, the network input/output (110 or 10) that would otherwise be needed in order to retrieve remotely stored metadata 182 of the collaboration system can be reduced or eliminated. The capabilities provided by the local file system and the advanced file services module vastly improves the responsiveness of the user interface, and thus improves the user experience when the user is interacting over shared content objects 141, events 143, metadata and users 109 of the collaboration system 171.

More specifically, the local file system provides various types of prefetching of files, folders, and/or metadata to be stored on the local device to facilitate local caching of shared content objects from the collaboration system 171. In some embodiments, a cache manager 135 in the local file system can dynamically allocate space to accommodate multiple local cache regimes so as to hold multiple respective sets of data to facilitate low latency local access. In some embodiments, the cache manager might allocate (1) an online data storage area and (2) an offline data storage area (e.g., to facilitate offline content access). In certain embodiments, the cache manager can monitor file system requests to invoke certain cache management operations based at least in part on various cache management rules. In some embodiments, certain such cache management rules can be used to generate a set of directives that perform cache management operations pertaining to the movement of data.

As one specific example, prefetching and caching can be performed over metadata and content of files and/or folders that the user has in some manner explicitly indicated an interest (e.g., by indicating a "Favorite"). In some embodiments, prefetching and caching can be performed over files or folder that the user is predicted to have an interest. Predictions for prefetching can be based on the user's collaborators, and/or based on events carried out over files or folders by the user's collaborators. In some cases, predictive prefetching retrieves entire sets of metadata covering subfolders throughout an entire folder hierarchy. In some cases, predictive prefetching retrieves portions of metadata covering only certain predicted branches of folder hierarchies. In some embodiments, the user's folder browsing history (e.g., the user's history of opening and editing files) can be used in predicting the portion of the file tree for which the user might have interest. Such browsing history can also be used to inform predictive prefetching techniques.

Additionally, determinations can be made as to the extent of the prefetching based on the capabilities of the user device, bandwidth availability, and other performance characteristics of the network or user device. Such determinations and predictions can be made by a recommendation engine. Various embodiments of a recommendation engine and use of predictions for intelligent caching are further disclosed infra.

Further details regarding general approaches to cache managers and use of predictions when performing caching are described in U.S. application Ser. No. 15/140,270 titled "MULTI-REGIME CACHING IN A VIRTUAL FILE SYSTEM FOR CLOUD-BASED SHARED CONTENT", filed on Apr. 27, 2016, which is hereby incorporated by reference in its entirety.

The foregoing discussion of FIG. 1A includes mention of an advanced file services module 103, one embodiment of which is disclosed in further detail as follows.

Figure 1B:
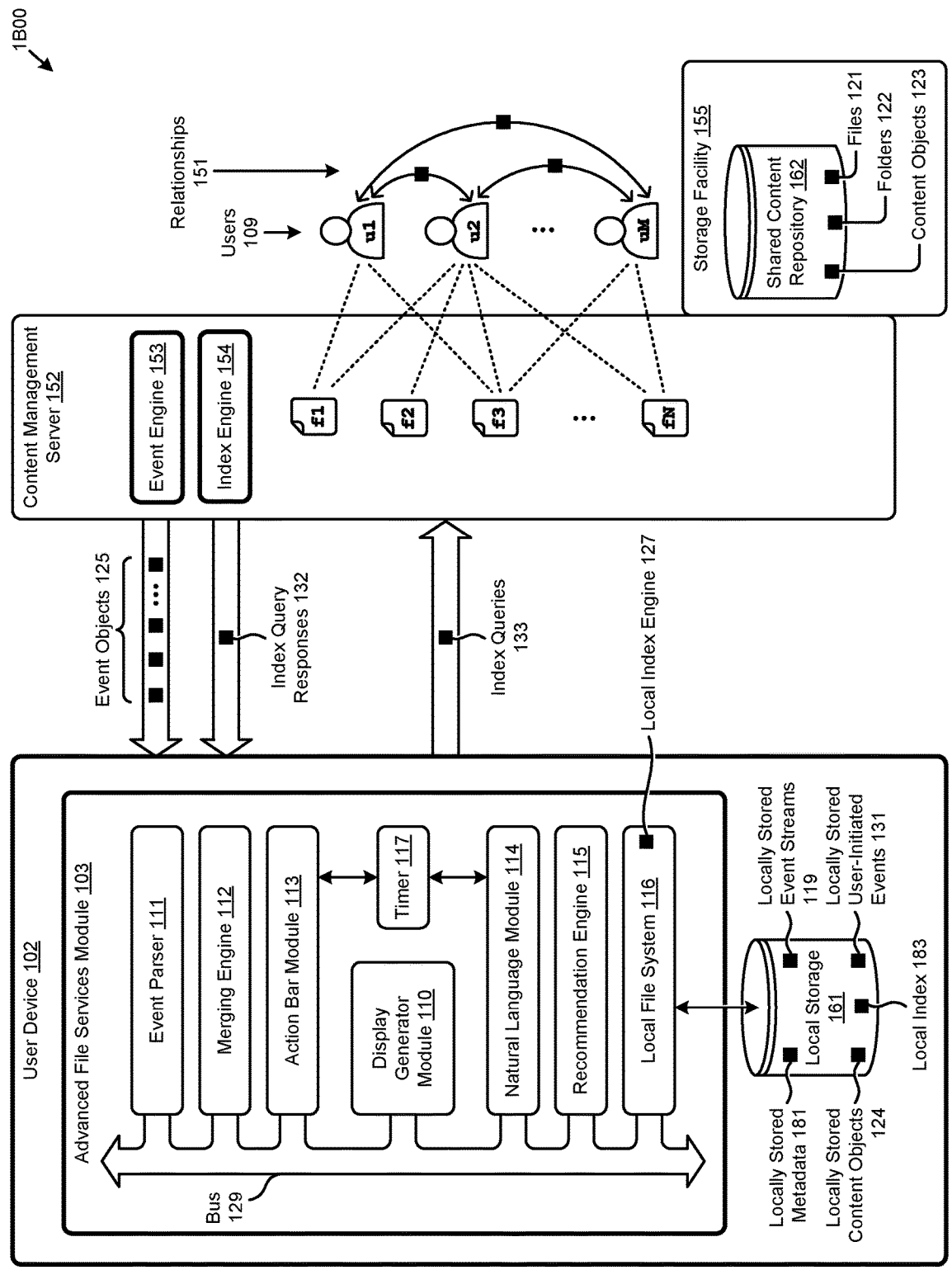
FIG. 1B is a block diagram of a system including a user device that performs client-side processing of events received from a collaboration system, according to an embodiment.

FIG. 1B is a block diagram of a system 1B00 including a user device that performs client-side processing of events received from a collaboration system. As an option, one or more variations of system 1B00 or any aspect thereof may be implemented in the context of the architecture and functionality of the embodiments described herein. The system 1B00 or any aspect thereof may be implemented in any environment.

The embodiment shown in FIG. 1B is merely one example. As shown, the system presents a configuration of multiple modules that are interconnected to facilitate inter-module communications. More specifically, the inter-process bus 129 serves as a communication channel between any of the shown modules and/or engines. In the example embodiment of FIG. 1B, the advanced file services module 103 includes an event parser 111, a merging engine 112, an action bar module 113, a natural language module 114, a recommendation engine 115, a local file system 116, a timer 117, and a display generator module 110.

Users 109 interact with files, folders and/or other collaboration objects and relationships 151 are developed as the users continue interaction. Any of the aforementioned files 121, folders 122 and/or other content objects 123 and/or respective metadata can be stored in a shared content repository 162, which can in turn be situated at a storage facility 155. Such a storage facility can be included within the partitioning of a content management server 152, or can be separate and adjacent (as shown) or can be remote, possibly involving multiple local- and/or multiple cloud-oriented storage facilities.

As users interact with the shared content, a stream of events are codified (e.g., by event engine 153) into event objects 125. Event objects are broadcast to user devices. The user devices perform further processing of the event object in the aforementioned modules. In some cases, events that arises either from events raised at the content management server or from events that are raised at the user devices can precipitate communications between the user device and the content management server. Strictly as one example, the advanced file services module 103 might query the content management server 152 for information that is contained in or available from an index engine 154. Any reply or replies from such a query can be delivered to the requester as index query responses 132. Some embodiments maintain a local index 183. Such a local index 183 can comprise any information that has been retrieved from index engine 154 as well as any other locally-generated index entries. Specifically, the user device can formulate index queries 133 and receive index query responses 132, which in turn might be stored in a local index 183.

In addition to the information that has been retrieved from index engine 154, the local index 183 might comprise locally generated index entries that include index entries that are defined for fast local access to any of the locally-store metadata and or any locally-stored events. The index can comprise index entries that derive from contents of the locally-stored content objects. Index maintenance can take place as a background task on the user device such that the user does not experience increased latency or sluggishness during the building and/or maintenance of the index. As such, even during the maintenance of a local index, the user will still experience fast responses when local search-oriented operations are performed using the local index.

As shown, the user device comprises one or more forms of local storage 161. In some situations, the local storage 161 includes the aforementioned local index 183 and/or locally stored metadata 181 (e.g., metadata pertaining to collaboration objects) and/or, in some situations, the local storage 161 comprises locally stored event streams 119 (e.g., streams of event objects pertaining to events raised anywhere in the environment) and/or locally-stored event objects pertaining to user-initiated events 131, which events derive from interactions with or on or by the user device. In some situations, the local storage 161 includes locally stored content objects 124, which locally stored content objects may derive from, or be cached copies of, any of the content objects 123 and/or respective metadata and/or any other server-side collaboration data that are stored in storage facility 155. The status of locally stored content objects (e.g., locally "cached" objects) might be recorded in locally stored metadata 181.

The foregoing discussion of FIG. 1B includes a display generator module that facilitates generation of screen devices to be displayed on or by the user device. Such screen devices and uses thereof are disclosed in further detail as follows.

Figure 2A:
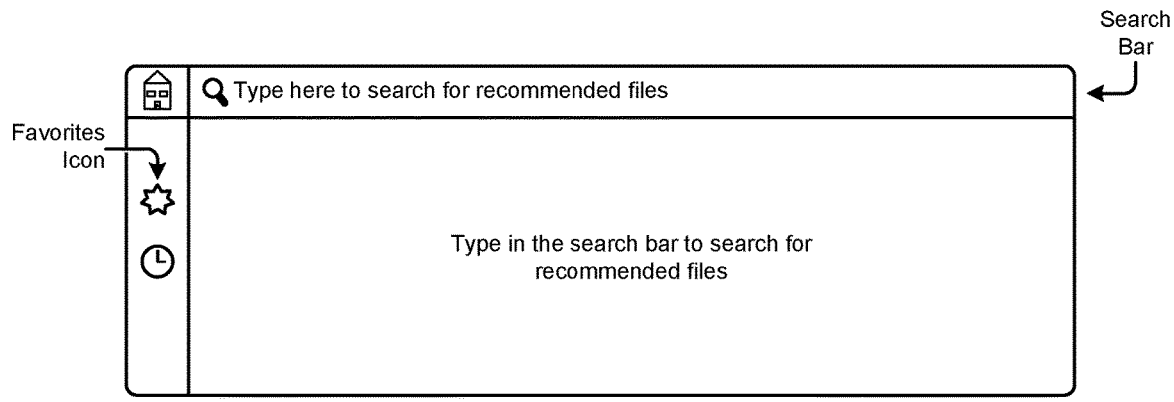
FIG. 2A through FIG. 2F presents variations of display screen devices that are used for user device display of files, folders, and events that derive from multiple user collaboration activities, according to an embodiment.
Figure 2B:
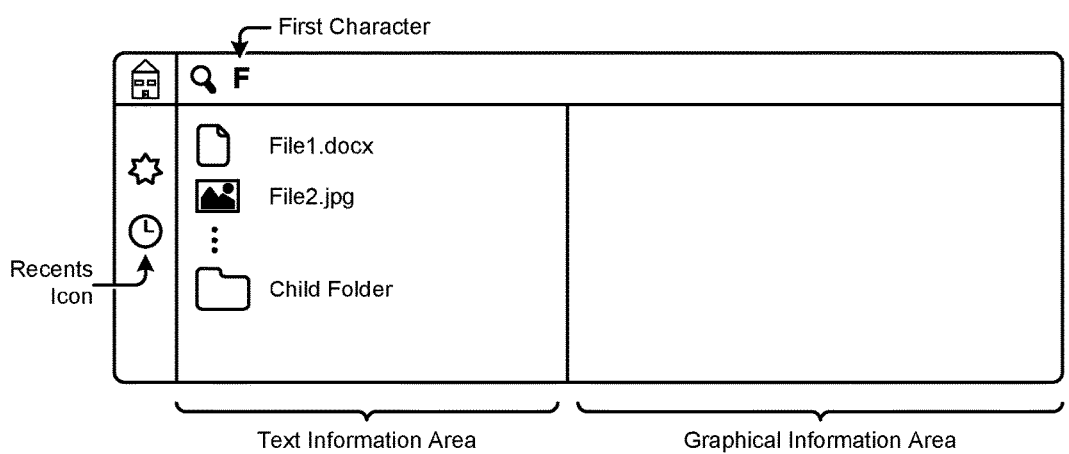
Figure 2C:
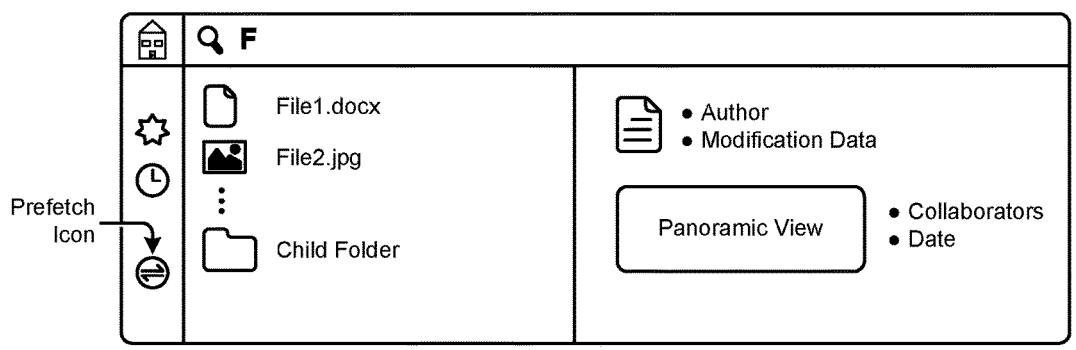
Figure 2D:
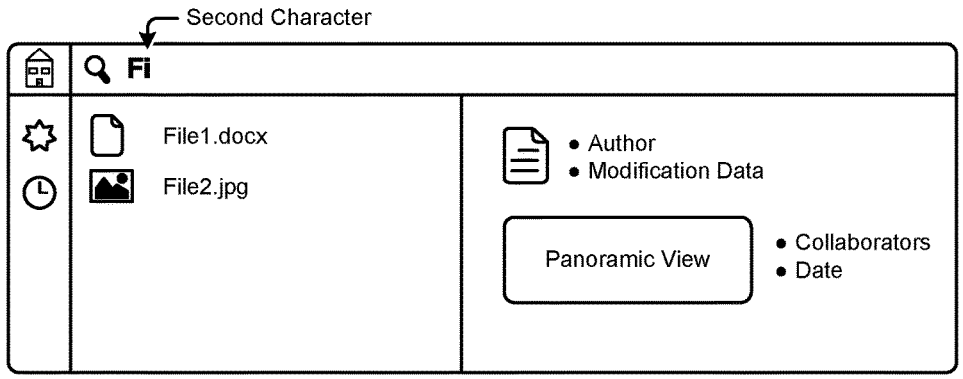
Figure 2E:
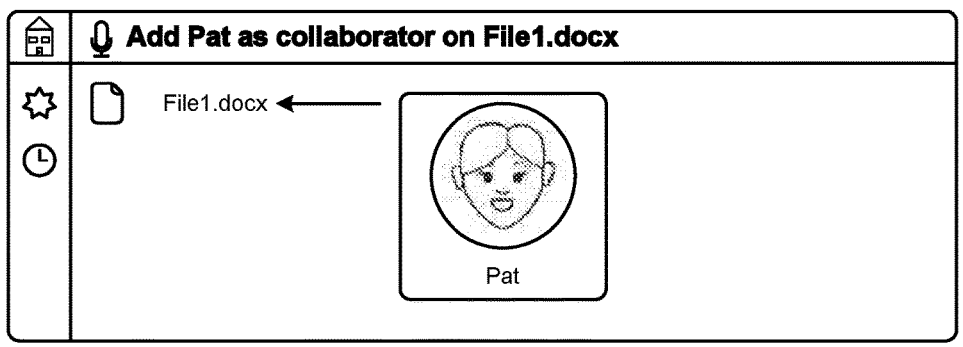
Figure 2F:
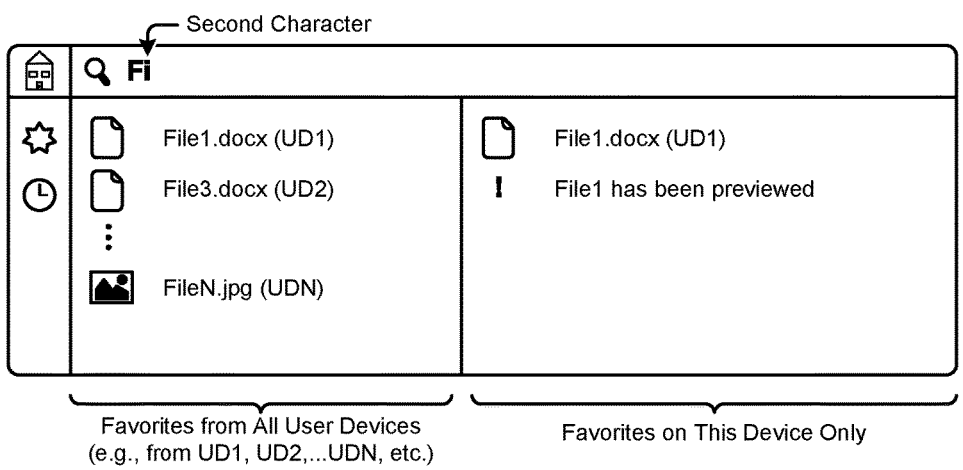

FIG. 2A through FIG. 2F presents variations of display screen devices 2A through FIG. 2F that are used for user device display of files, folders, and events that derive from multiple user collaboration activities. As an option, one or more variations of display screen devices or any aspect thereof may be implemented in the context of the architecture and functionality of the embodiments described herein. The display screen devices or any aspect thereof may be implemented in any environment. The embodiments shown in FIG. 2A through FIG. 2F depict merely examples.

FIG. 2A depicts a screen device that includes a search bar and a "favorites" icon". FIG. 2B depicts an occurrence of a user entering a first character of a sequence of characters into the search bar. The screen device of FIG. 2B includes an area for display of text information and an area for display of graphical information. FIG. 2C includes example previews and/or icons that result from processing characters in the search bar. The example shown includes a prefetch icon that permits a user to explicitly request that a particular object be prefetched and processed by the local file system. In some embodiments, one or more of the items in the text information area can be selected, after which, upon activating prefetching by clicking the prefetch icon, the contents of the selected items are prefetched and indexed and/or otherwise processed by the local file system. In some cases, prefetching is performed in multiple phases to retrieve multiple representations of the content object. For example, in a first phase, merely a thumbnail representation of a content object is fetched, followed by, in a second phase, a first few pages of the content object, followed by, in a third phase, a table of contents for the object, followed by (for example) additional portions of the content object. The user interface can be populated with whatever representations have been retrieved, and can be populated whenever the representations are received at the user device.

FIG. 2D depicts user entry of a second character and corresponding changes in the text information area.

FIG. 2E depicts text (e.g., a command or search term) being entered (e.g., typed) or dictated (e.g., spoken) into a search/action bar. Specifically, the shown command is "Add Pat as a collaborator on File1.docx". In this specific embodiment, the icon in the action bar depicts a microphone to denote a command being spoken/dictated into the command area. Dictation is enabled when the cursor is next to the microphone icon.

FIG. 2F includes a first area for display of "Recents" (e.g., recently accessed files or other objects) and/or favorites that arise from any/all of the user's devices and a second area for display of for display of only the favorites that arise from this particular user device.

Figure 3:
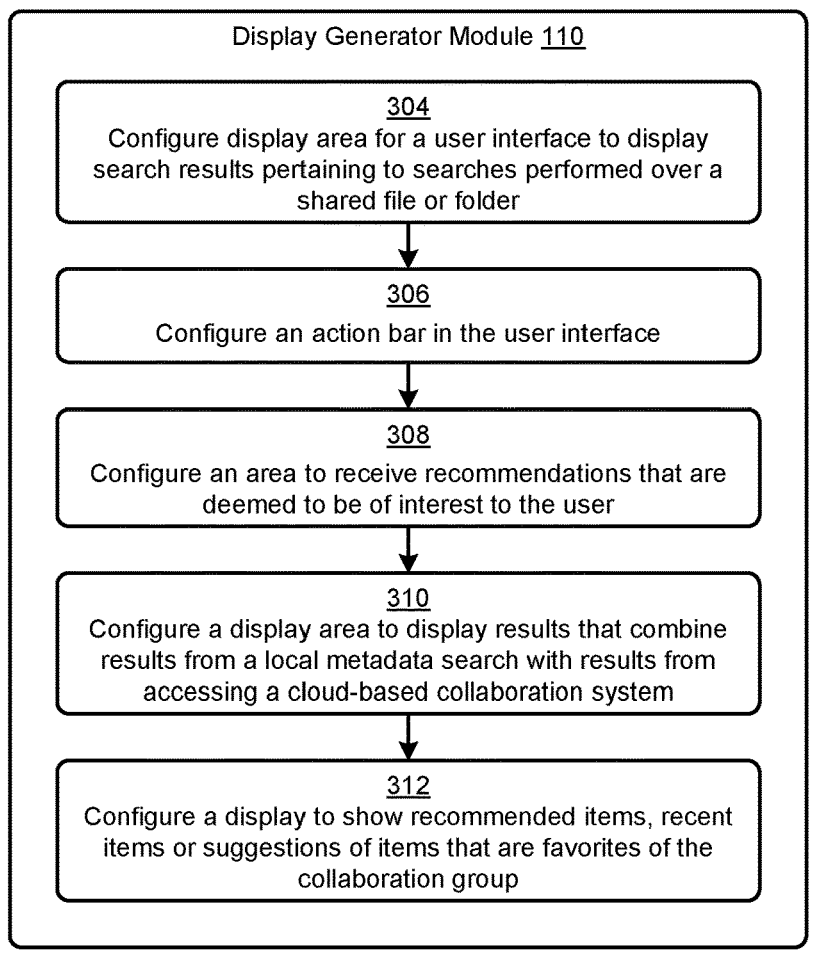
FIG. 3 is a flowchart for configuring display screen devices that support the herein-disclosed information display techniques, according to an embodiment.

FIG. 3 is a flowchart for configuring display screen devices that support the herein-disclosed information display techniques 300. As an option, one or more variations of information display techniques 300 or any aspect thereof may be implemented in the context of the architecture and functionality of the embodiments described herein. The information display techniques 300 or any aspect thereof may be implemented in any environment.

The embodiment shown in FIG. 3 is merely one example. As shown, the information display techniques include steps for configuring display areas to display search results (step 304), configuring an action bar (step 306), configuring an area to receive recommendations (step 308), configuring an area to display results that combine results from multiple sources (step 310), and configuring an area to display "favorites" (step 312).

In some embodiments, a display generator module 110 configures the sizes and visual characteristics of the display areas based on characteristics of the user device. For example, if a user device has a relatively larger screen, then relatively larger areas can be initially defined. On the other hand, if the user device has a relatively smaller area for display, then space-conserving techniques such as scroll bars might be implemented. Furthermore, display areas may be associated with particular data sources. For example, and as shown in step 310, a particular display area might be configured for combining results from two different data sources. One exemplary embodiment combines incoming data from two asynchronously operating data sources, a first data source that delivers data from the local file system and a second data source that delivers data from the collaboration system. The display generator module 110 can interleave two or more data sources when presenting items in a user interface.

The foregoing discussion of FIG. 3 includes configuration of screen devices for displaying results of processing. Some of the processing involved in producing results are disclosed in further detail infra.

Figure 4A:
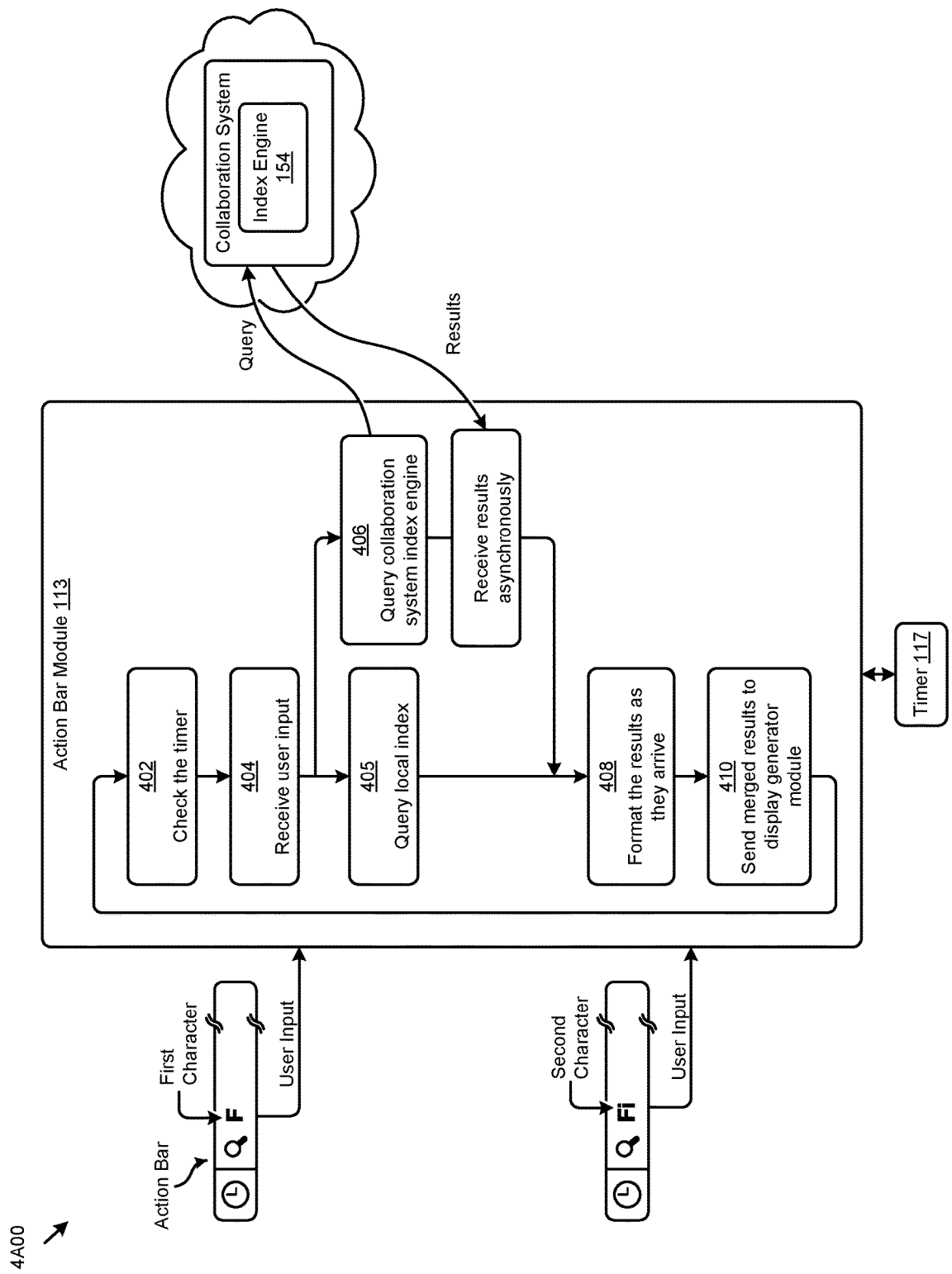
FIG. 4A is a first embodiment of an action bar processing system that uses successive timer-controlled iterations when processing query results received from a collaboration system, according to an embodiment.

FIG. 4A is a first embodiment of an action bar processing system 4A00 that uses successive timer-controlled iterations when processing query results received from a collaboration system. As an option, one or more variations of action bar processing system 4A00 or any aspect thereof may be implemented in the context of the architecture and functionality of the embodiments described herein. The action bar processing system 4A00 or any aspect thereof may be implemented in any environment.

The embodiment shown in FIG. 4A is merely one example depicting an implementation of action bar processing. The shown action bar processing includes a step 402 for consulting a timer 117, which timer is used in conjunction with receiving user input (step 404). In some cases, partially completed user input can be used to form a query to an index engine. In many cases, a local index engine is sufficiently up-to-date (e.g., only a second or a few seconds out of date), and the local index can be queried (step 405) In other cases, the local index engine is either known to be out of date, or suspected as being out of date, in which case the index engine 154 of the collaboration system can be queried (step 406). In still other cases, and as shown, the local index engine is queried (step 405) at the same time that the index engine 154 of the collaboration system is queried (step 406). Results can be received asynchronously, and formatted as the results arrive (step 408), which results are then merged for display (step 410).

The timer can be set, reset and calibrated dynamically based on then-current conditions. For example, a default time period can be established that models how long to wait after a last keystroke before considering the user input as being a candidate for use in the aforementioned query. In some cases, such as when network latency is known to be longer than a predetermined threshold, the time period of the timer can be lengthened so as to avoid aggressively forming a query. In other cases, such as when the local metadata has a large amount of at least partial matches, the timer can be set shorter such that queries are performed very frequently, even on partial user input. To aid in producing query results very quickly (e.g., even keystroke by keystroke) an index engine might be used. In the example of FIG. 4A, if a local index is used, the list of files, folders or other objects that begin with the shown first character "F" can be displayed even before a second character (e.g., "i") is typed. Then, when the second character is typed, the list of files, folders or other objects that begin with, for instance, the characters "Fi" can be displayed.

In response to a query, the index engine returns results to the action bar module, which then formats the results (step 408) and sends the formatted results to a display generator module (step 410). The foregoing process is repeated periodically. More specifically, periodically, if and when a second and third, and nth character is entered by the user into the screen device of the search/action bar, the process is repeated and newly-received query results are formatted for presentation to the display generator module.

Figure 4B:
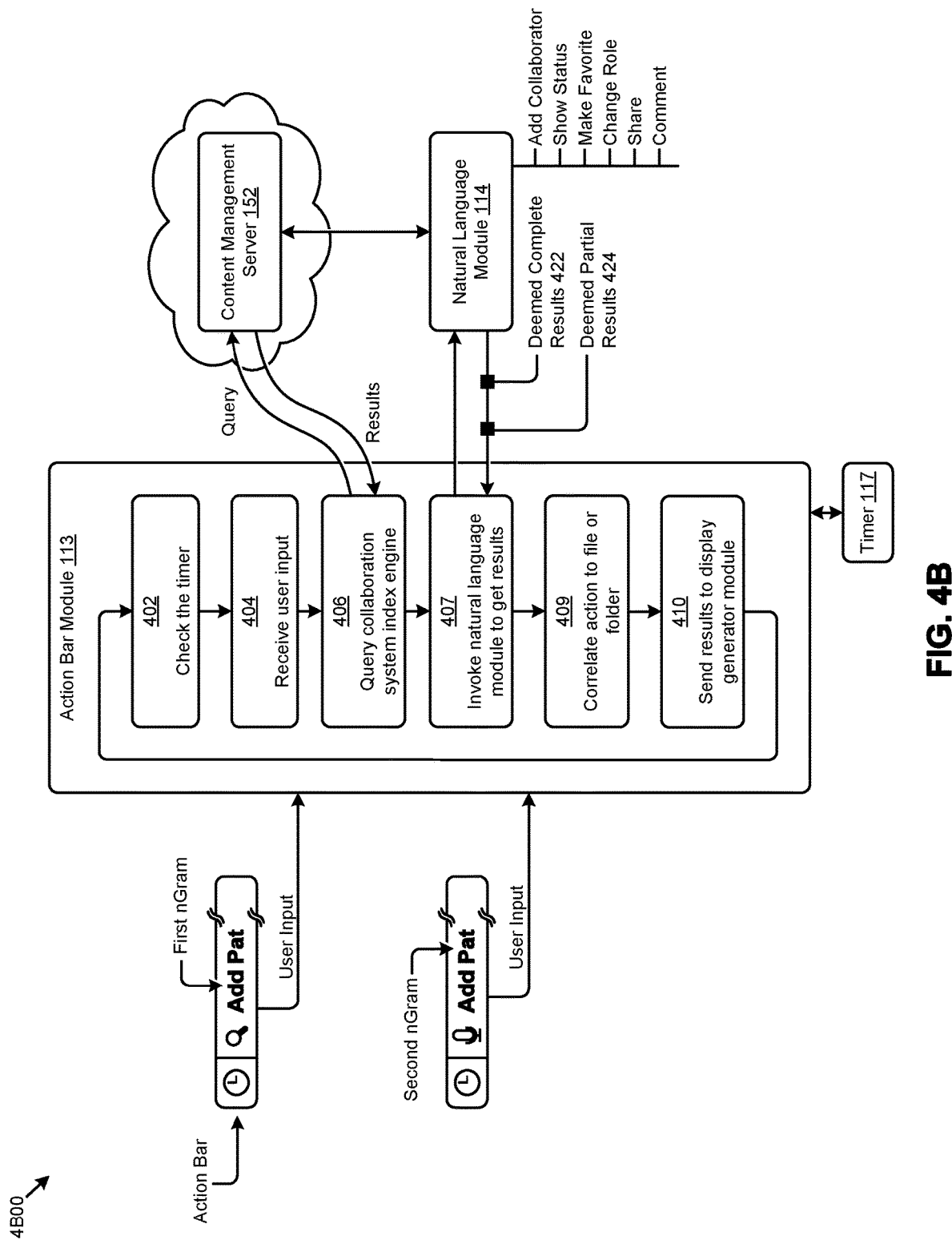
FIG. 4B is a second embodiment of an action bar processing system that uses a natural language module for implementing client-side processing of events from a collaboration system, according to an embodiment.

The foregoing discussion of FIG. 4A includes the concept of a search/action bar in a first embodiment. FIG. 4B as follows discusses a second embodiment of such a search/action bar.

FIG. 4B is a second embodiment of an action bar processing system 4B00 that uses a natural language processor for implementing client-side processing of events from a collaboration system. As an option, one or more variations of action bar processing system 4B00 or any aspect thereof may be implemented in the context of the architecture and functionality of the embodiments described herein. The action bar processing system 4B00 or any aspect thereof may be implemented in any environment.

The search/action bar can serve as an area where the user can enter characters or an ngram or search terms to be used in search queries or can be used as an area where the user can enter a command. The aforementioned natural language processor such as the shown natural language module 114 can be used to determine the nature of the user input. In some cases, the natural language module 114 can determine if the user entered characters are meant to be search terms or if the user entered characters are meant to be commands to the content management server 152 (e.g., commands that pertain to a shared content object). In some cases, the natural language module 114 can determine if the user input is sufficiently complete so as to deem the results as being complete results (e.g., deemed complete results 422), or if the user input is incomplete so as to deem the results as being partial results (e.g., deemed partial results 424).

The natural language module 114 is configured so as to be able to detect and/or predict specific occurrences of frequently used commands as input by users. Specifically, and as shown, the natural language module 114 can detect and/or predict specific occurrences of frequently used commands based on incomplete input. The shown example includes a small set of commands, namely, "Add Collaborator", "Show Status", "Make Favorite", "Change Role", "Share", and "Comment". A predicted intent by the user to indicate a desire to "Add Collaborator", or "Make Favorite" can be determined based on the first character alone since there is no ambiguity with respect to the other commands. A predicted intent by the user to indicate a desire to "Change Role" or "Comment" can be determined based on just two characters. A predicted intent by the user to indicate a desire to "Show Status", or "Share" can be determined based on three characters.

As shown, user input (e.g., typing of characters) at the action bar module can invoke (at step 407) natural language processing so as to quickly determine a user's intent to carry out a particular command. The results and/or metadata pertaining to the complete or partial user input that indicates an action are correlated to a file or folder (step 409). Results, whether they be complete results or partial results are sent to the display generator (step 410), and the sequence of steps is repeated, as shown by the loop. In some cases, the correlation to a file or folder results from explicit indications by a user (e.g., by typing of additional characters). In some cases, the correlation to a file or folder results from implicit indications by a user, (e.g., by occurrence of a selected item in the search bar, or action bar, or other user interface area).

The previously introduced natural language module 114 is disclosed in further detail as follows.

Figure 5:
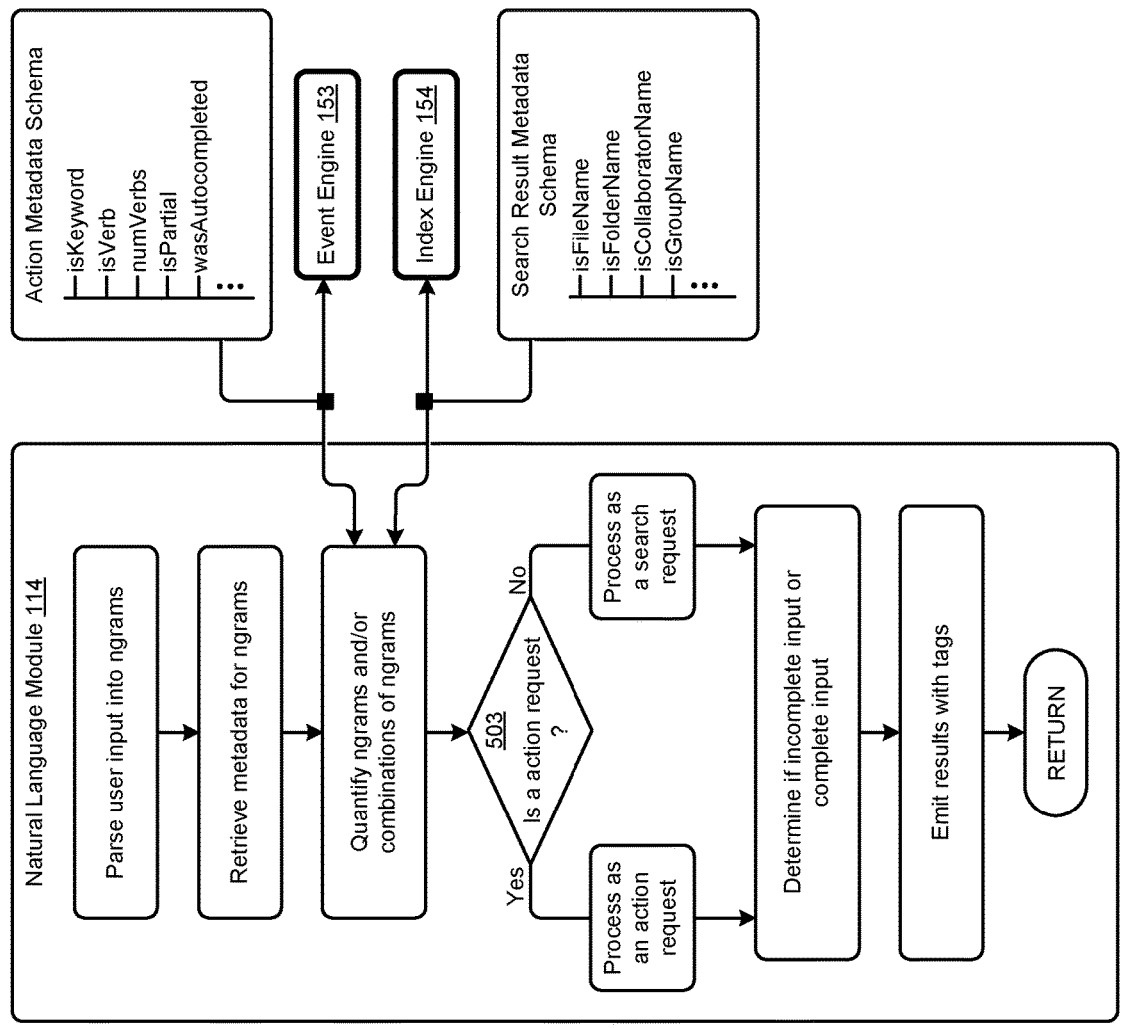
FIG. 5 is a natural language processing system as used in systems that perform client-side processing of events received from a collaboration system, according to an embodiment.

FIG. 5 is a natural language processing system 500 as used in systems that perform client-side processing of events received from a collaboration system. As an option, one or more variations of natural language processing system 500 or any aspect thereof may be implemented in the context of the architecture and functionality of the embodiments described herein. The natural language processing system 500 or any aspect thereof may be implemented in any environment.

The embodiment shown in FIG. 5 is merely one example. As shown, the natural language processing system includes processing to parse user input into ngrams, and to retrieve metadata pertaining to the ngrams. In some cases, and as shown, an ngram or combination of ngrams are quantified with respect to action metadata or search result metadata, or both. The quantification can use any/all information retrieved from an instance of an event engine 153 and/or an index engine 154. The action metadata retrieved from event engine 153 might be codified so as to conform to a particular action metadata schema, which action metadata schema is used by both the server and the client. As shown, the action metadata schema might include tests and/or tags that pertain to various natural language constructions pertaining to actions. Similarly, the search result metadata schema might include tests and/or tags that pertain to various natural language constructions pertaining to search results. The natural language module 114 can implement decision-making to determine if the user input is pertaining to an action request (e.g., at decision 503) in which case the "Yes" branch of decision 503 is taken. Otherwise, the "No" branch of decision 503 is taken and the user input is processed as a search request.

Information from the natural language module, and/or any information subsequently retrieved from any module of the system can be used to form recommendations to be presented to the user. More specifically, a user device can implement an advanced file services module 103 that implements techniques that present relevant recommendations to the user. One embodiment of a recommendation engine 115 is given in the context of the system of FIG. 6.

Figure 6:
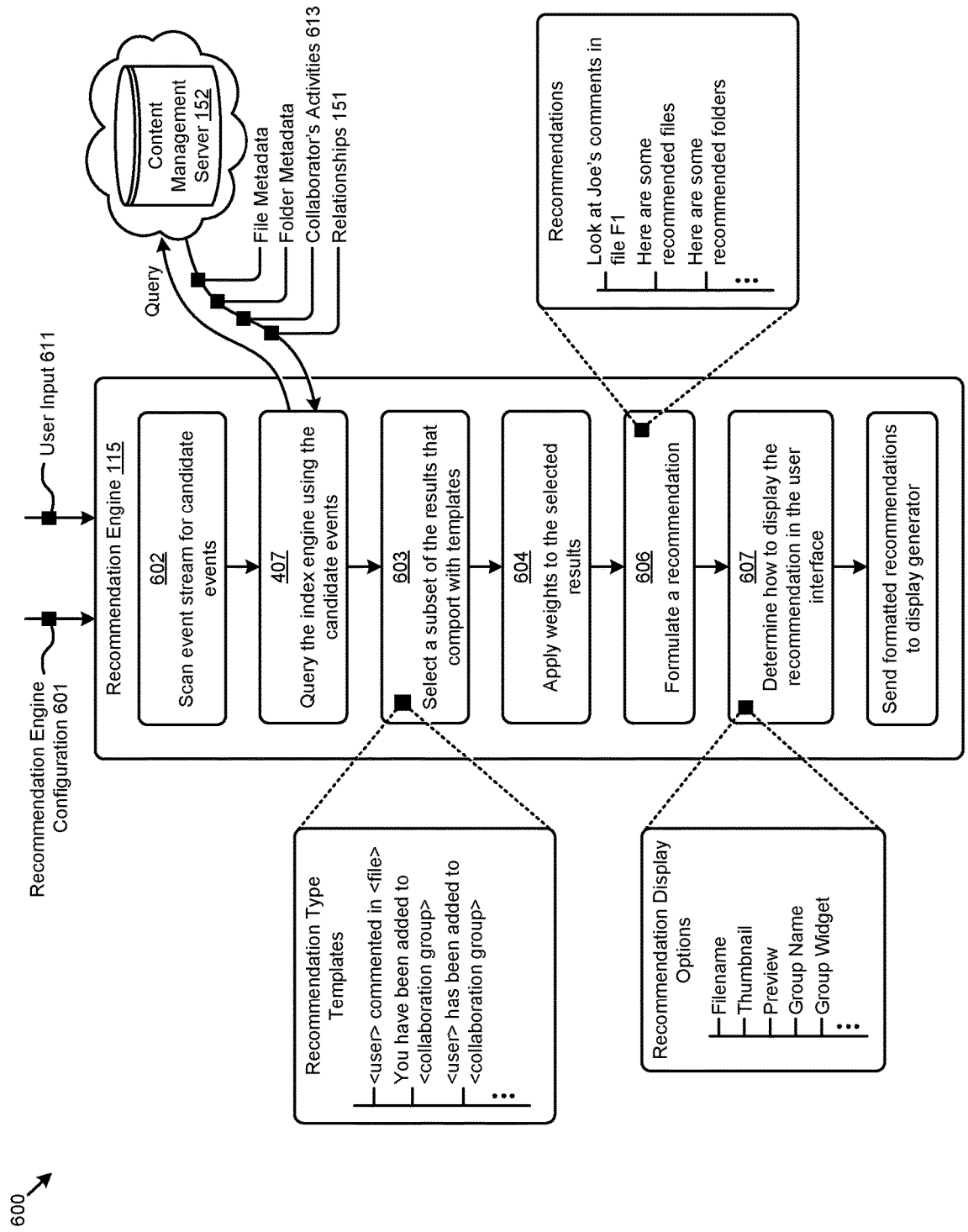
FIG. 6 depicts a recommendation system as used to present relevancy recommendations by processing events received from a collaboration system, according to an embodiment.

FIG. 6 depicts a recommendation system 600 as used to present relevancy recommendations by processing events received from a collaboration system. As an option, one or more variations of recommendation system 600 or any aspect thereof may be implemented in the context of the architecture and functionality of the embodiments described herein. The recommendation system 600 or any aspect thereof may be implemented in any environment.

The embodiment shown in FIG. 6 is merely one example. As shown, the recommendation system receives configuration settings 601. Such configuration settings are used to interpret user input and such configuration settings can also be used when formulating recommendation weightings.

In the settings of recommendation system 600, recommendation engine 115 formulates a query based on a stream of events. Specifically, at step 602, a recent stream of events is scanned for occurrences of event types that are deemed to be good candidates for use with a recommendation system. Strictly as examples, events that are more recent might be more likely candidates. Events that pertain to files or folders that are also in the user's "Recents" files or folders or "Favorites" files or folders might be deemed as likely candidates. In some cases, the recent stream of events is scanned for occurrences of events that pertain to particular relationships 151, such as being added to a collaboration group. The events considered as candidates in step 602 can be used in one or more queries to an index engine (step 407) at the content management server (as shown) or the events considered as candidates in step 602 can be used in one or more queries to a local index engine. The results of such queries can include metadata pertaining to files, and/or folders and/or collaborators and/or their activities 613, and/or relationships that in some way pertain to the user and/or the user's specific input 611.

In some embodiments, one or more components of the recommendation engine 115 relies on, at least in part, a set of recommendation templates so as to select a subset (at step 603) of the returned results. In this and other embodiments, returned results from the content management server comprise any forms of server-side collaboration data that can be mapped into the variables of the templates. As shown, the templates might be codified such that one or more variables (e.g., "<user>", or "<collaboration group>") is juxtaposed to literals. In one example, a recommendation can be emitted, such as "Joe commented in File1.docx", where the user name "Joe" is assigned to the variable "<user>", and the file name "File1.docx" is assigned to the variable "<file>". If sufficient results are returned such that all of the variables of a template can be assigned with a value from the returned results, then the value-assigned version of the template is considered a recommendation candidate.

A weight or weights are applied (at step 604) to recommendation candidates. On the basis of a ranking of the weighted results, the recommendation engine 115 formulates a recommendation (step 606). Strictly as one example, if a recommendation template was given as "<user> commented in <file>" (where "user" and "file" are variables), and the returned results comprised a "comment" event that references a pairing of a particular user's commenting action (e.g., "Joe's" commenting actions) over a particular file (e.g., file "F1"), then the formulated recommendation might be "Look at Joe's comments in file F1".

The recommendations can be accompanied by additional information such as attributes, and/or icons that serve to characterize the recommendation. As shown, step 607 serves to determine how such additional information is to be displayed to the user. As shown, recommendation display options include, "filename", and/or "thumbnail" and/or other preview, and/or a "group name" (e.g., collaboration group name), and/or a screen device such as a "group widget" (e.g., a pulldown menu).

The recommendation engine can use locally stored streams of events to identify updates to files that the user has created, updated or has otherwise expressed an interest. For example, given the scenario where the current user is/was the original author of File1.docx, then the recommendation engine could emit "Joe updated File1.docx 3 hours ago". Another recommendation based on a view event might emit, "Pat viewed File1.docx 2 hours ago". In addition, or instead of the foregoing emissions from the recommendation engine, the recommendation engine can emit any server-side collaboration data pertaining to any user or object or event or data structure of the collaboration system.

The foregoing recommendation engine of FIG. 6 might emit recommendations that include recommendations pertaining to locally store objects or metadata, and/or objects or metadata that are stored in the shared content repository of a collaboration system. In cases involving display of search results and/or results from the recommendations, the results are merged based on various merging criteria. A set of sample merging techniques are disclosed in further detail as follows.

FIG. 7A and FIG. 7B depict merging techniques as used in systems that perform client-side processing of events received from a collaboration system. As an option, one or more variations of merging techniques or any aspect thereof may be implemented in the context of the architecture and functionality of the embodiments described herein. The merging techniques or any aspect thereof may be implemented in any environment.

FIG. 7A depicts a set of files for which metadata pertaining to those files was retrieved from locally stored metadata. Subsequently (e.g., at time=T1), after querying the index engine 154, additional file information is retrieved, which can then be merged with the set of files for which metadata pertaining to those files was retrieved from locally stored metadata. In some situations, previews and/or other information, and/or attributes and/or icons can be provided in a user interface, as shown.

As depicted, at least a portion of the set of matches to the search terms which had locally stored data displayed (e.g., at time=T0) in the shown display area. In addition to merging displayed data pertaining to the combination of locally stored metadata and metadata from the content management server 152, the depth of the search corpus can be expanded to perform a full search over any/all files that have content, regardless if the content is stored locally or remotely at the content management server 152. The remote side at content management server 152 can act on a query to perform a full data search (e.g., text search) over the content objects, and can return results that are merged (e.g., at time=T1) with any results from a locally-performed full data search.

The foregoing discussion of FIG. 7A and FIG. 7B discusses merging files, however other types of information can be retrieved from multiple sources, and thus might be subject to merging. Some such merging of information is shown and discussed as pertains to FIG. 8.

Figure 8:
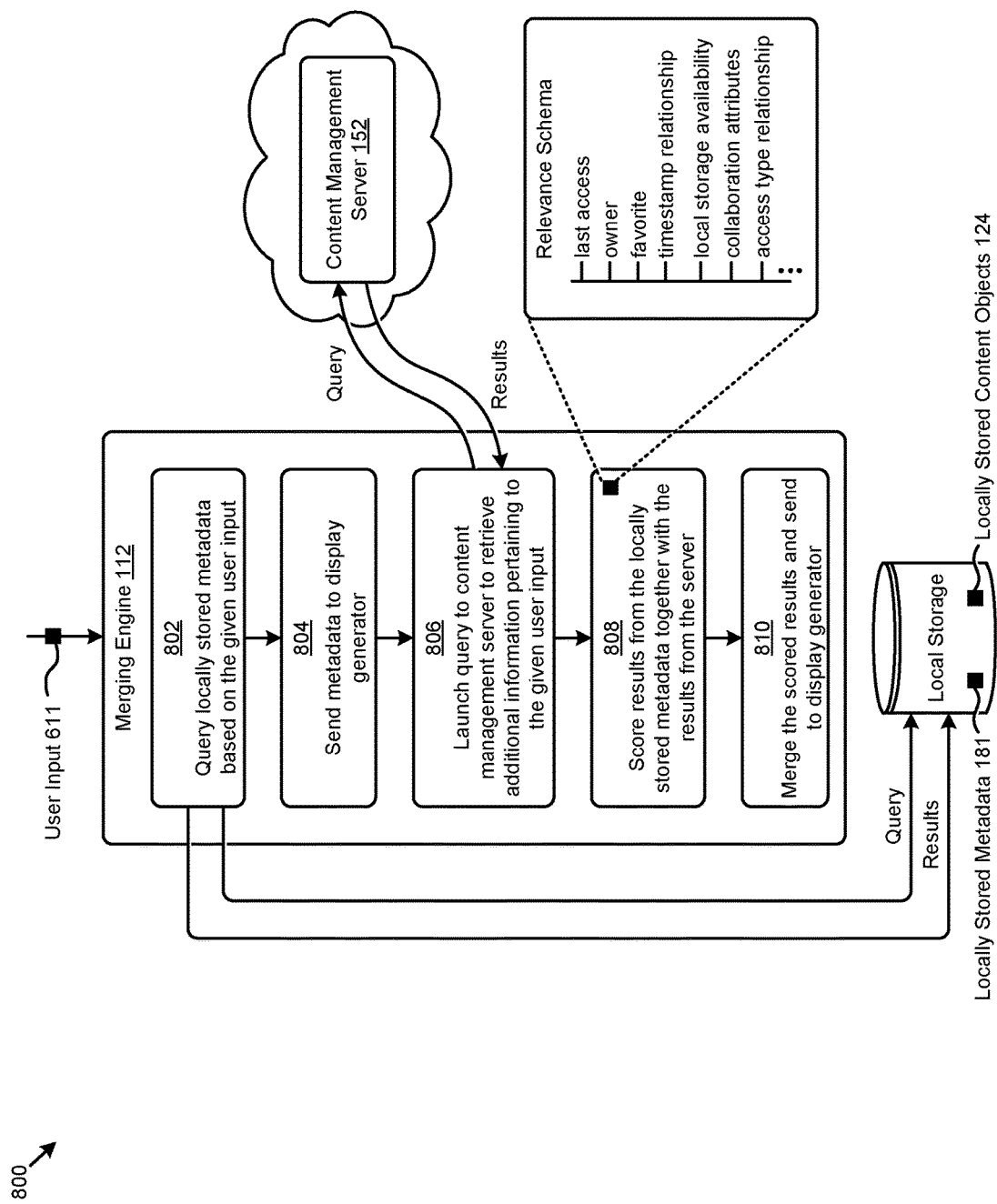
FIG. 8 is an information merging system as used to perform merging of time-stamped collaboration events, according to an embodiment.

FIG. 8 is an information merging system 800 as used to perform merging of time-stamped collaboration events. As an option, one or more variations of information merging system 800 or any aspect thereof may be implemented in the context of the architecture and functionality of the embodiments described herein. The information merging system 800 or any aspect thereof may be implemented in any environment.

The merging engine 112 accesses locally stored metadata (step 802). In some cases, it is possible for the information from the locally stored metadata to be immediately sent to the display generator. This offers the user some immediate feedback, even though there might be subsequent steps to retrieve additional information from the content management server 152. As shown, after sending displayable information to the display generator (step 804), a query is formulated and launched (step 806) to inquire to the content management server 152 for results. Results that derive from the locally stored metadata are combined with the results from the server. Ordering the entries from the results into the combination uses a scoring technique (at step 808). The scoring technique can apply weights or other types of quantities or tags to any/all of the entries to as to quantify a relevance. The weights or other types of quantities or tags can be applied to any attributes. For example, a relevance schema might include aspects or attributes of a content object, which aspects or attributes might include events (e.g., access type), time stamping (e.g., time stamp of accesses), ownership and/or preference information, relationship information, etc.

Weights, and/or tags and/or other metrics pertaining to relevance of results (e.g., results from local-stored metadata and/or results returned from the content management server 152) can be applied to individual items of information. The weights are applied in accordance with a relevancy schema. Strictly as one example, a relevancy schema might include information such as "last access", file or event "owner", aspects pertaining to any other user that has indicated a favorite, a timestamp relationship, and/or an access type relationship. When the weights or other metrics pertaining to relevance of results have been applied to individual items of information, the weighted (e.g., ordered) set of merged results can be sent (step 810) to the display generator.

The foregoing discussion of FIG. 8 mentions the concept of favorites and other listings of objects in a particular order. Displays of listings can be proposed automatically and/or can be limited and/or ordered automatically by using the techniques discussed in the following FIG. 9.

Figure 9:
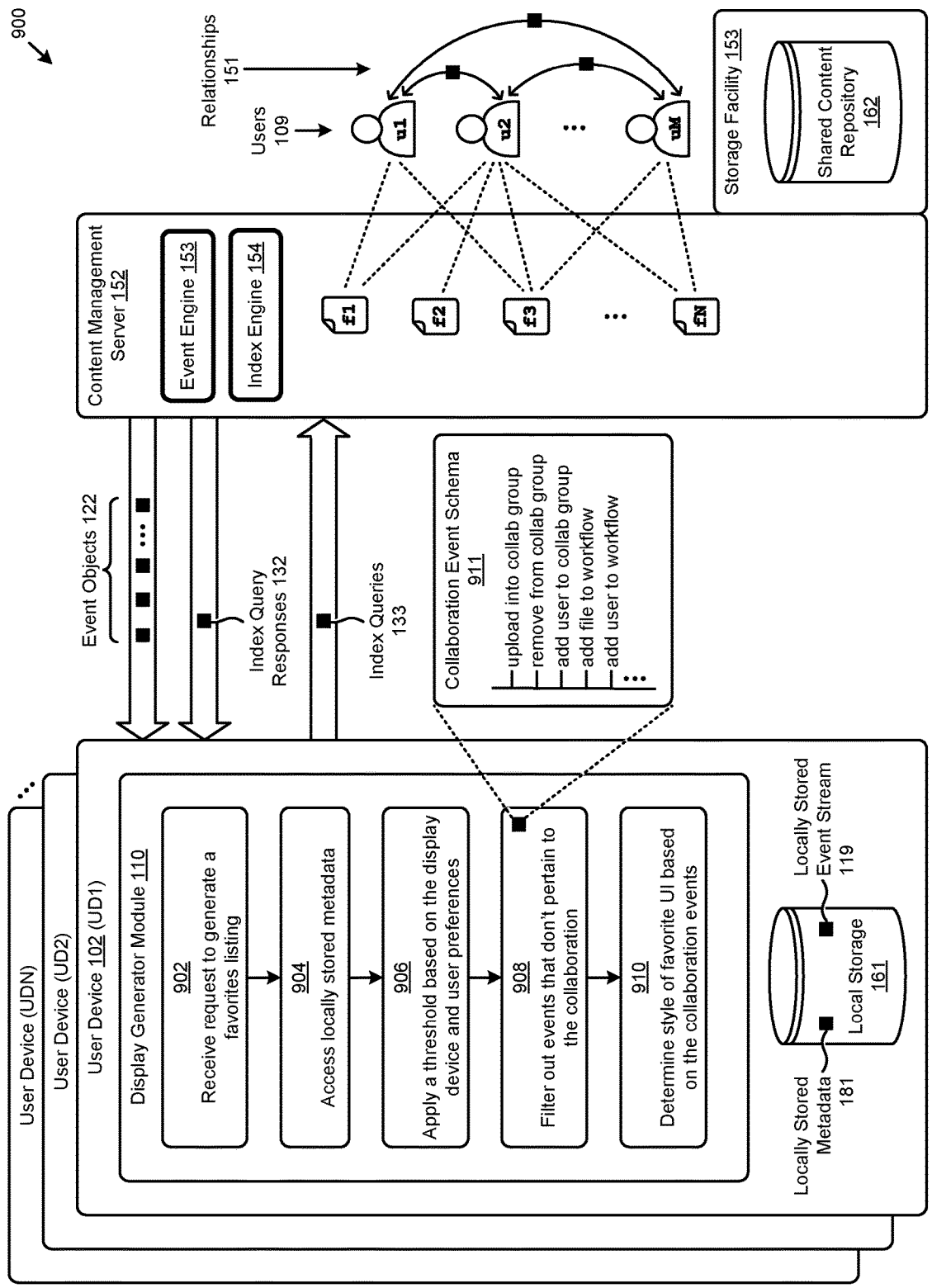
FIG. 9 depicts a display generation system as used when configuring screen devices that display collaboration events received from a collaboration system, according to an embodiment.

FIG. 9 depicts a display generation system 900 as used when configuring screen devices that display collaboration events received from a collaboration system. As an option, one or more variations of display generation system 900 or any aspect thereof may be implemented in the context of the architecture and functionality of the embodiments described herein. The display generation system 900 or any aspect thereof may be implemented in any environment.

The shown display generator module 110 includes a step 908 to filter out events that do not pertain to collaboration. Strictly as an example, the display generator module 110 further includes a step 902 to receive user input, in this case user input to generate a recommended favorites listing. Then, in step 904, an operational unit of the display generator module accesses locally stored metadata (e.g., event stream metadata). There might be a very large amount of locally-stored metadata, therefore step 906 serves to apply a threshold to limit the number of items in the listing. A collaboration event schema is used to select-in events that pertain to relevant collaboration activities and/or the collaboration event schema is used to filter out (step 908) events that do not pertain to the collaboration. The shown collaboration event schema 911 includes event descriptions in the form of tags on events that pertain to collaboration events such as "upload into a collaboration group", "remove from a collaboration group", "add a user to a collaboration group", "add a file to a workflow", etc.

At step 910, processing is invoked so as to determine a particular user's preferred style of presentation in the UI. Such processing might include consideration of the user's history to determine that user's specific historical trends that serve to indicate that particular user's preferred style of the UI and/or presentation styles within the UI. In some cases, machine learning is employed in combination with some portions of the user's history. Such machine learning can be used to predict a user's favorite or preferred UI based on learned behaviors that result from observations of explicit user-specified UI operations. Such observations can include any or all events that a user takes on the user device. In some cases, and as discussed in the following FIG. 10, observations can be tagged so as to aid in processing of user history and/or so as to be used as features in any machine learning implementation.

Figure 10:
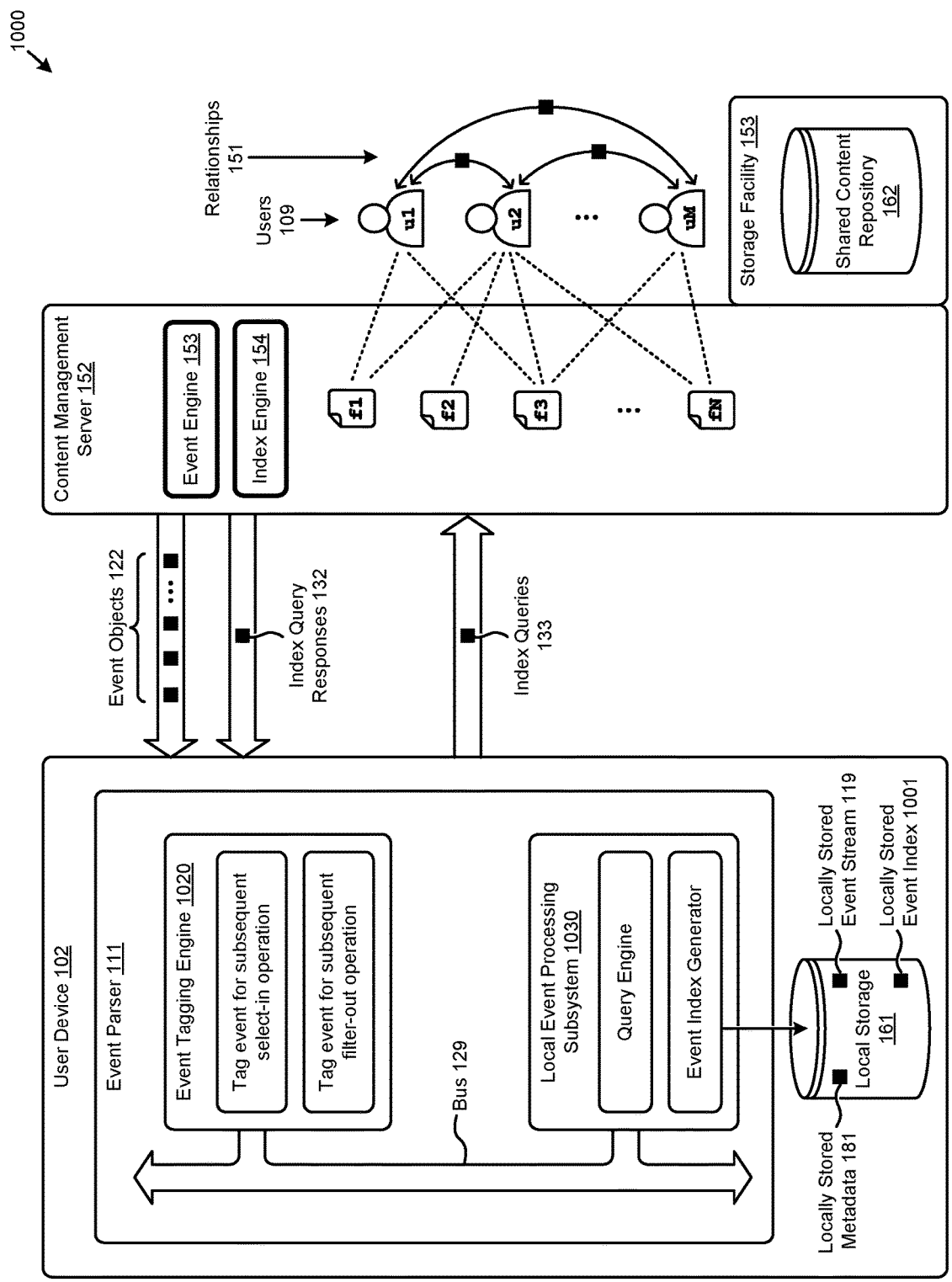
FIG. 10 depicts an event parser system as used to perform tagging of events received from a collaboration system, according to an embodiment.

FIG. 10 depicts an event parser system 1000 as used to perform tagging of events received from a collaboration system. As an option, one or more variations of event parser system 1000 or any aspect thereof may be implemented in the context of the architecture and functionality of the embodiments described herein. The event parser system 1000 or any aspect thereof may be implemented in any environment.

The shown event parser 111 includes a tagging engine 1020 that tags user events. Such tagging of events can be used when saving user history and/or for providing observations to a machine learning system. The tagging engine 1020 can communicate with a local event processing subsystem 1030 over a bus. Events processed by the shown event parser 111 can originate from either the content management server 152 or from a locally stored event index 1001.

Results of the tagging operations performed by the event tagging engine 1020 of the event parser 111 can be used to facilitate generation of recommendations and ordering of items in a recommendation listing, and/or can be used to determine occurrences and ordering of items in a favorites listing, etc.

System Architecture Overview
Additional System Architecture Examples

Figure 11A:
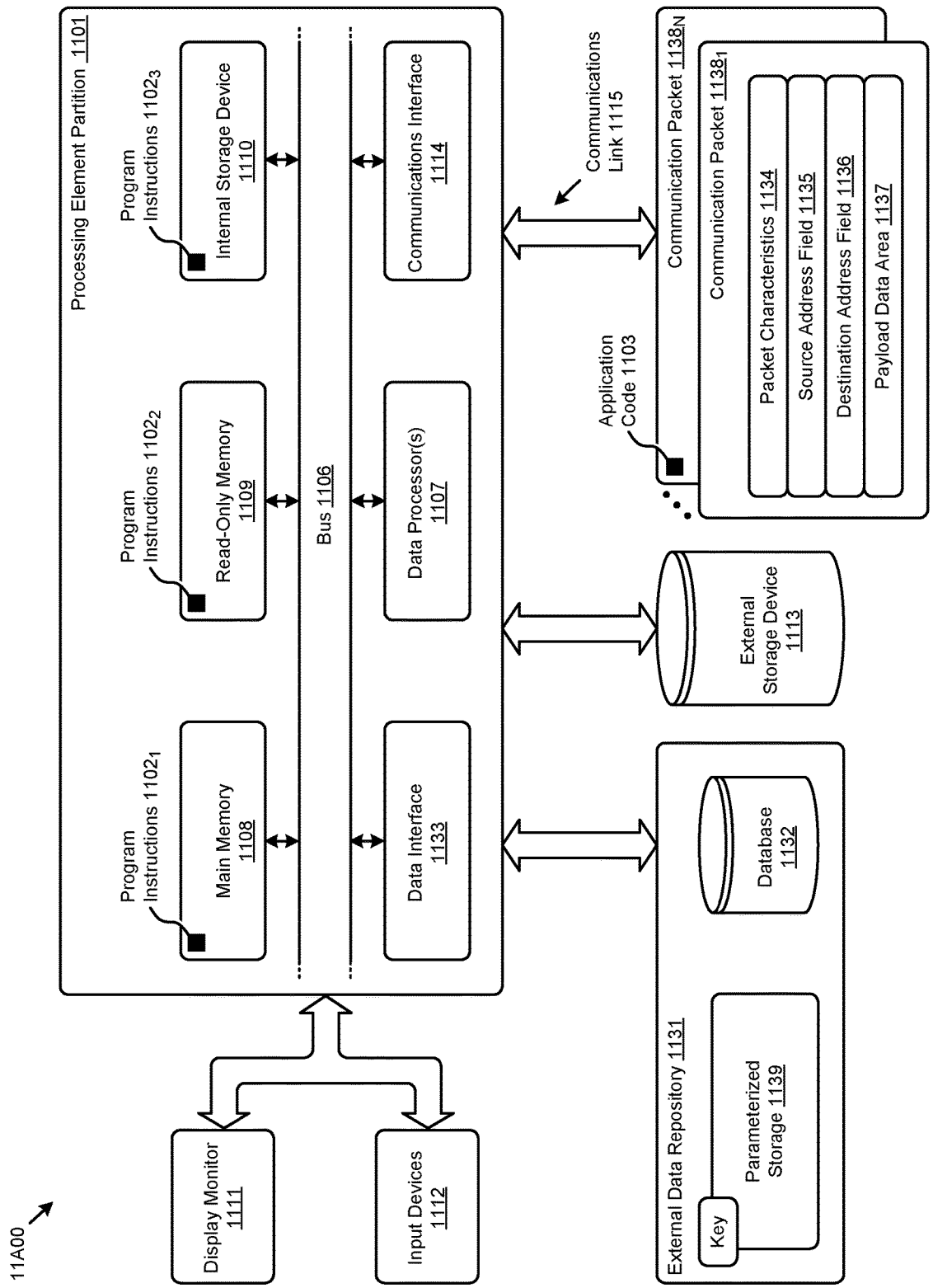
FIG. 11A and FIG. 11B present block diagrams of computer system architectures having components suitable for implementing embodiments of the present disclosure, and/or for use in the herein-described environments.

FIG. 11A depicts a block diagram of an instance of a computer system 11A00 suitable for implementing embodiments of the present disclosure. Computer system 11A00 includes a bus 1106 or other communication mechanism for communicating information. The bus interconnects subsystems and devices such as a central processing unit (CPU), or a multi-core CPU (e.g., data processor 1107), a system memory (e.g., main memory 1108, or an area of random access memory (RAM)), a non-volatile storage device or non-volatile storage area (e.g., read-only memory 1109), an internal storage device 1110 or external storage device 1113 (e.g., magnetic or optical), a data interface 1133, a communications interface 1114 (e.g., PHY, MAC, Ethernet interface, modem, etc.). The aforementioned components are shown within processing element partition 1101, however other partitions are possible. Computer system 11A00 further comprises a display 1111 (e.g., CRT or LCD), various input devices 1112 (e.g., keyboard, cursor control), and an external data repository 1131.

According to an embodiment of the disclosure, computer system 11A00 performs specific operations by data processor 1107 executing one or more sequences of one or more program code instructions contained in a memory. Such instructions (e.g., program instructions $1102_1$, program instructions $1102_2$, program instructions $1102_3$, etc.) can be contained in or can be read into a storage location or memory from any computer readable/usable storage medium such as a static storage device or a disk drive. The sequences can be organized to be accessed by one or more processing entities configured to execute a single process or configured to execute multiple concurrent processes to perform work. A processing entity can be hardware-based (e.g., involving one or more cores) or software-based, and/or can be formed using a combination of hardware and software that implements logic, and/or can carry out computations and/or processing steps using one or more processes and/or one or more tasks and/or one or more threads or any combination thereof.

According to an embodiment of the disclosure, computer system 11A00 performs specific networking operations using one or more instances of communications interface 1114. Instances of communications interface 1114 may comprise one or more networking ports that are configurable (e.g., pertaining to speed, protocol, physical layer characteristics, media access characteristics, etc.) and any particular instance of communications interface 1114 or port thereto can be configured differently from any other particular instance. Portions of a communication protocol can be carried out in whole or in part by any instance of communications interface 1114, and data (e.g., packets, data structures, bit fields, etc.) can be positioned in storage locations within communications interface 1114, or within system memory, and such data can be accessed (e.g., using random access addressing, or using direct memory access DMA, etc.) by devices such as data processor 1107.

Communications link 1115 can be configured to transmit (e.g., send, receive, signal, etc.) any types of communications packets (e.g., communication packet $1138_1$, communication packet $1138_N$) comprising any organization of data items. The data items can comprise a payload data area 1137, a destination address 1136 (e.g., a destination IP address), a source address 1135 (e.g., a source IP address), and can include various encodings or formatting of bit fields to populate packet characteristics 1134. In some cases, the packet characteristics include a version identifier, a packet or payload length, a traffic class, a flow label, etc. In some cases, payload data area 1137 comprises a data structure that is encoded and/or formatted to fit into byte or word boundaries of the packet.

In some embodiments, hard-wired circuitry may be used in place of or in combination with software instructions to implement aspects of the disclosure. Thus, embodiments of the disclosure are not limited to any specific combination of hardware circuitry and/or software. In embodiments, the term "logic" shall mean any combination of software or hardware that is used to implement all or part of the disclosure.

The term "computer readable medium" or "computer usable medium" as used herein refers to any medium that participates in providing instructions to data processor 1107 for execution. Such a medium may take many forms including, but not limited to, non-volatile media and volatile media. Non-volatile media includes, for example, optical or magnetic disks such as disk drives or tape drives. Volatile media includes dynamic memory such as RAM.

Common forms of computer readable media include, for example, floppy disk, flexible disk, hard disk, magnetic tape, or any other magnetic medium; CD-ROM or any other optical medium; punch cards, paper tape, or any other physical medium with patterns of holes; RAM, PROM, EPROM, FLASH-EPROM, or any other memory chip or cartridge, or any other non-transitory computer readable medium. Such data can be stored, for example, in any form of external data repository 1131, which in turn can be formatted into any one or more storage areas, and which can comprise parameterized storage 1139 accessible by a key (e.g., filename, table name, block address, offset address, etc.).

Execution of the sequences of instructions to practice certain embodiments of the disclosure are performed by a single instance of a computer system 11A00. According to certain embodiments of the disclosure, two or more instances of computer system 11A00 coupled by a communications link 1115 (e.g., LAN, public switched telephone network, or wireless network) may perform the sequence of instructions required to practice embodiments of the disclosure using two or more instances of components of computer system 11A00.

Computer system 11A00 may transmit and receive messages such as data and/or instructions organized into a data structure (e.g., communications packets). The data structure can include program instructions (e.g., application code 1103), communicated through communications link 1115 and communications interface 1114. Received program code may be executed by data processor 1107 as it is received and/or stored in the shown storage device or in or upon any other non-volatile storage for later execution. Computer system 11A00 may communicate through a data interface 1133 to a database 1132 on an external data repository 1131.

Data items in a database can be accessed using a primary key (e.g., a relational database primary key).

Processing element partition 1101 is merely one sample partition. Other partitions can include multiple data processors, and/or multiple communications interfaces, and/or multiple storage devices, etc. within a partition. For example, a partition can bound a multi-core processor (e.g., possibly including embedded or co-located memory), or a partition can bound a computing cluster having plurality of computing elements, any of which computing elements are connected directly or indirectly to a communications link. A first partition can be configured to communicate to a second partition. A particular first partition and particular second partition can be congruent (e.g., in a processing element array) or can be different (e.g., comprising disjoint sets of components).

A module as used herein can be implemented using any mix of any portions of the system memory and any extent of hard-wired circuitry including hard-wired circuitry embodied as a data processor 1107. Some embodiments include one or more special-purpose hardware components (e.g., power control, logic, sensors, transducers, etc.). Some embodiments of a module include instructions that are stored in a memory for execution so as to facilitate operational and/or performance characteristics pertaining to user device processing of events from a collaboration system. A module may include one or more state machines and/or combinational logic used to implement or facilitate the operational and/or performance characteristics pertaining to user device processing of events from a collaboration system.

Various implementations of database 1132 comprise storage media organized to hold a series of records or files such that individual records or files are accessed using a name or key (e.g., a primary key or a combination of keys and/or query clauses). Such files or records can be organized into one or more data structures (e.g., data structures used to implement or facilitate aspects of user device processing of events from a collaboration system). Such files, records, or data structures can be brought into and/or stored in volatile or non-volatile memory. More specifically, the occurrence and organization of the foregoing files, records, and data structures improve the way that the computer stores and retrieves data in memory, for example, to improve the way data is accessed when the computer is performing operations pertaining to user device processing of events from a collaboration system, and/or for improving the way data is manipulated when performing computerized operations pertaining to new ways to collect, process and present events and other information pertaining to such collaboration.

Figure 11B:
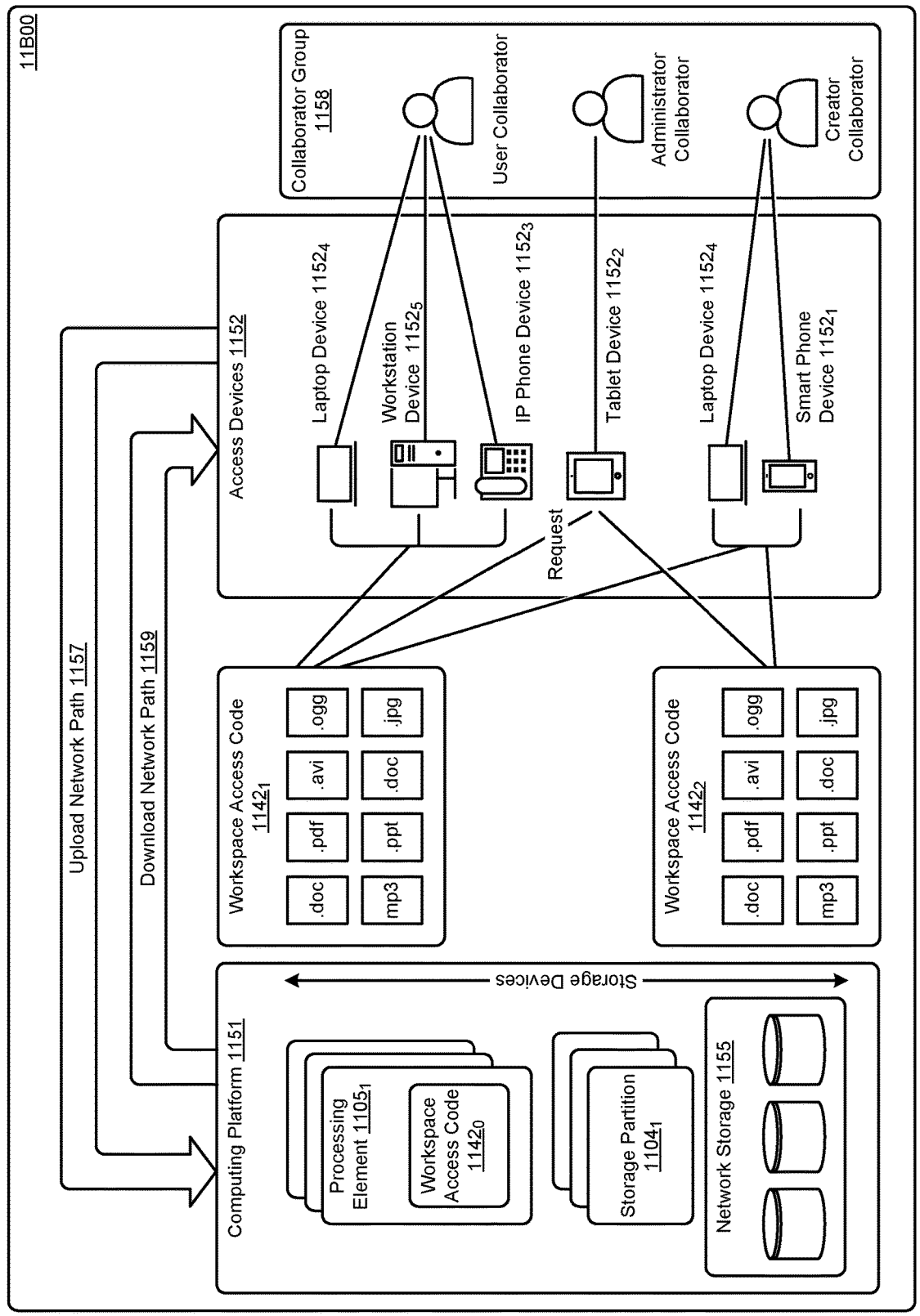

FIG. 11B depicts a block diagram of an instance of a cloud-based environment 11B00. Such a cloud-based environment supports access to workspaces through the execution of workspace access code (e.g., workspace access code $1142_0$, workspace access code $1142_1$, and workspace access code $1142_2$). Workspace access code can be executed on any of access devices 1152 (e.g., laptop device $1152_4$, workstation device $1152_5$, IP phone device $1152_3$, tablet device $1152_2$, smart phone device $1152_1$, etc.). A group of users can form a collaborator group 1158, and a collaborator group can be composed of any types or roles of users. For example, and as shown, a collaborator group can comprise a user collaborator, an administrator collaborator, a creator collaborator, etc. Any user can use any one or more of the access devices, and such access devices can be operated concurrently to provide multiple concurrent sessions and/or other techniques to access workspaces through the workspace access code.

A portion of workspace access code can reside in and be executed on any access device. Any portion of the workspace access code can reside in and be executed on any computing platform 1151, including in a middleware setting. As shown, a portion of the workspace access code resides in and can be executed on one or more processing elements (e.g., processing element 11051). The workspace access code can interface with storage devices such as networked storage 1155. Storage of workspaces and/or any constituent files or objects, and/or any other code or scripts or data can be stored in any one or more storage partitions (e.g., storage partition 11041). In some environments, a processing element includes forms of storage, such as RAM and/or ROM and/or FLASH, and/or other forms of volatile and non-volatile storage.

A stored workspace can be populated via an upload (e.g., an upload from an access device to a processing element over an upload network path 1157). A stored workspace can be delivered to a particular user and/or shared with other particular users via a download (e.g., a download from a processing element to an access device over a download network path 1159).

In the foregoing specification, the disclosure has been described with reference to specific embodiments thereof. It will however be evident that various modifications and changes may be made thereto without departing from the broader spirit and scope of the disclosure. For example, the above-described process flows are described with reference to a particular ordering of process actions. However, the ordering of many of the described process actions may be changed without affecting the scope or operation of the disclosure. The specification and drawings are to be regarded in an illustrative sense rather than in a restrictive sense.

What is claimed is:

1. A method for client-side processing of remotely-stored collaboration system information, the method comprising:
   providing, at a collaboration system server, executable code for implementing a local file system, wherein the local file system processes locally-stored metadata; and
   transmitting the executable code to a user device in response to receiving a message from the user device to download the executable code from the collaboration system server, wherein the executable code is executable at the user device to configure the local file system to:
   issue a first request from the user device to perform a first access to server-side collaboration data from the collaboration system server;
   issue a second request from the user device to perform a second access to the server-side collaboration data, the second requests to retrieve additional server-side collaboration data based at least in part on a prediction;
   store, by the local file system, at least a portion of the additional server-side collaboration data on the user device to form locally-stored collaboration system information and local metadata; and to
   process, by the local file system, user input to search the locally-stored collaboration system information using the local metadata and without performing a third access to the remotely-stored collaboration system information, wherein the local metadata processed by a local index at the user device is used to implement the search without performing the third access, and the local index at the user device interacts with an index engine at the collaboration system server.

2. The method of claim 1, wherein the local file system is further configured for:
   displaying at least a portion of the server-side collaboration data on a display of the user device;
   interacting with a user through the display, the interaction comprising at least one action taken over a shared content object;
   capturing at least one user-initiated event at the user device; and
   combining aspects of the at least one user-initiated event with at least one aspect of the server-side collaboration data that was retrieved from the collaboration system server.

3. The method of claim 2, wherein the server-side collaboration data comprises at least one of, a shared content object, an attribute of a shared content object, or an event object that characterizes an event performed over a shared content object.

4. The method of claim 2, wherein the combining comprises:
   organizing a first set of display screen devices pertaining to shared collaboration object metadata taken from local storage of the user device;
   sending a query to the collaboration system server;
   displaying the first set of display screen devices before receiving responses to the query from the collaboration system server;
   organizing at least some of the responses of the query into a second set of display screen devices; and
   displaying a combination of the first set of display screen devices and the second set of display screen devices.

5. The method of claim 4, wherein the first set of display screen devices comprises at least one of, a preview taken from the local storage, or a thumbnail taken from the local storage.

6. The method of claim 4, wherein the first set of display screen devices comprises at least a portion of results of a content object search taken from the local storage, and wherein the second set of display screen devices comprises at least a portion of results of a content object search that had been executed on the collaboration system server.

7. The method of claim 2, wherein the aspects of the at least one user-initiated event is a search term, and wherein the aspect of the server-side collaboration data comprises at least a portion of metadata that was retrieved from the collaboration system server.

8. The method of claim 7, further comprising processing at least the portion of metadata that was retrieved from the collaboration system server with respect to the search term to form a recommendation weighting and wherein the recommendation weighting is based at least in part on at least one of a stream of events taken from local storage.

9. The method of claim 1, wherein the local index at the user device corresponds to at least a local index engine that manages the local metadata and the locally-stored collaboration system information.

10. The method of claim 2, wherein the combining comprises:
    organizing a first set of display screen devices pertaining to shared collaboration object metadata that had been favorited by the user;
    sending a query to the collaboration system server, the query comprising at least one aspect of the shared collaboration object metadata that had been favorited by the user;
    displaying the first set of display screen devices before receiving responses to the query from the collaboration system server;
    organizing at least some of the responses of the query into a second set of display screen devices; and
    displaying a combination of the first set of display screen devices and the second set of display screen devices.

11. The method of claim 10, wherein the second set of display screen devices correspond to shared collaboration object metadata that had not been favorited by the user.

12. The method of claim 11, further comprising invoking a natural language processor that determines when a sequence of characters or ngrams are search terms of a search query or when a sequence of characters or ngrams are actions to be taken.

13. A computer readable medium, embodied in a non-transitory computer readable medium, the non-transitory computer readable medium having stored thereon a sequence of instructions which, when stored in memory and executed by one or more processors causes the one or more processors to perform a set of acts for client-side processing of remotely-stored collaboration system information, the set of acts comprising:
    providing, at a collaboration system server, executable code for implementing a local file system, wherein the local file system processes locally-stored metadata; and
    transmitting the executable code to a user device in response to receiving a message from the user device to download the executable code from the collaboration system server, wherein the executable code is executable at the user device to configure the local file system to:
    issue a first request from the user device to perform a first access to server-side collaboration data from the collaboration system server;
    issue a second request from the user device to perform a second access to the server-side collaboration data, the second requests to retrieve additional server-side collaboration data based at least in part on a prediction;
    store, by the local file system, at least a portion of the additional server-side collaboration data on the user device to form locally-stored collaboration system information and local metadata; and to
    process, by the local file system, user input to search the locally-stored collaboration system information using the local metadata and without performing a third access to the remotely-stored collaboration system information, wherein the local metadata processed by a local index at the user device is used to implement the search without performing the third access, and the local index at the user device interacts with an index engine at the collaboration system server.

14. The computer readable medium of claim 13, wherein the local file system is further configured for:
    displaying at least a portion of the server-side collaboration data on a display of the user device;
    interacting with a user through the display, the interaction comprising at least one action taken over a shared content object;
    capturing at least one user-initiated event at the user device; and combining aspects of the at least one user-initiated event with at least one aspect of the server-side collaboration data that was retrieved from the collaboration system server.

15. The computer readable medium of claim 14, wherein the server-side collaboration data comprises at least one of, a shared content object, an attribute of a shared content object, or an event object that characterizes an event performed over a shared content object.

16. The computer readable medium of claim 14, wherein the combining comprises:
organizing a first set of display screen devices pertaining to shared collaboration object metadata taken from local storage of the user device;
sending a query to the collaboration system server;
displaying the first set of display screen devices before receiving responses to the query from the collaboration system server;
organizing at least some of the responses of the query into a second set of display screen devices; and
displaying a combination of the first set of display screen devices and the second set of display screen devices.

17. The computer readable medium of claim 16, wherein the first set of display screen devices comprises at least one of, a preview taken from the local storage, or a thumbnail taken from the local storage.

18. The computer readable medium of claim 16, wherein the first set of display screen devices comprises at least a portion of results of a content object search taken from the local storage, and wherein the second set of display screen devices comprises at least a portion of results of a content object search that had been executed on the collaboration system server.

19. A system for client-side processing of remotely-stored collaboration system information, the system comprising:
a storage medium having stored thereon a sequence of instructions; and
one or more processors that execute the sequence of instructions to cause the one or more processors to perform a set of acts, the set of acts comprising,
providing, at a collaboration system server, executable code for implementing a local file system, wherein the local file system processes locally-stored metadata; and
transmitting the executable code to a user device in response to receiving a message from the user device to download the executable code from the collaboration system server, wherein the executable code is executable at the user device to configure the local file system to:
issue a first request from the user device to perform a first access to server-side collaboration data from the collaboration system server;
issue a second request from the user device to perform a second access to the server-side collaboration data, the second requests to retrieve additional server-side collaboration data based at least in part on a prediction;
store, by the local file system, at least a portion of the additional server-side collaboration data on the user device to form locally-stored collaboration system information and local metadata; and to
process, by the local file system, user input to search the locally-stored collaboration system information using the local metadata and without performing a third access to the remotely-stored collaboration system information, wherein the local metadata processed by a local index at the user device is used to implement the search without performing the third access, and the local index at the user device interacts with an index engine at the collaboration system server.

20. The system of claim 19, wherein the local file system is further configured for:
displaying at least a portion of the server-side collaboration data on a display of the user device;
interacting with a user through the display, the interaction comprising at least one action taken over a shared content object;
capturing at least one user-initiated event at the user device; and
combining aspects of the at least one user-initiated event with at least one aspect of the server-side collaboration data that was retrieved from the collaboration system server.

21. The method of claim 1, wherein the additional server-side collaboration data is predictively fetched for a user from the collaboration system server based at least in part upon a collaboration event carried out over a collaboration object by a collaborator of the user, wherein the additional server-side collaboration data corresponding to the collaboration object acted upon by the collaborator is predictively fetched into the locally-stored collaboration system information according to the second access to avoid performing network operations to perform the third access to the remotely-stored collaboration system information.

* * * * *